US012800218B2

(12) United States Patent
Fang et al.

(10) Patent No.: US 12,800,218 B2
(45) Date of Patent: *Nov. 17, 2026

(54) BOX DEVICE

(71) Applicants: HEFEI MIDEA REFRIGERATOR CO., LTD., Hefei (CN); HEFEI HUALING CO., LTD., Hefei (CN); MIDEA GROUP CO., LTD., Foshan (CN)

(72) Inventors: Junwei Fang, Hefei (CN); Daojun Yu, Hefei (CN); Xuekang Liu, Hefei (CN); Zhigang Lv, Hefei (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 285 days.

This patent is subject to a terminal disclaimer.

(21) Appl. No.: 18/704,048

(22) PCT Filed: Aug. 17, 2022

(86) PCT No.: PCT/CN2022/113128

§ 371 (c)(1),
(2) Date: Apr. 23, 2024

(87) PCT Pub. No.: WO2023/071434

PCT Pub. Date: May 4, 2023

(65) Prior Publication Data

US 2026/0153280 A1 Jun. 4, 2026

(30) Foreign Application Priority Data

Oct. 29, 2021 (CN) ........................ 202111275429.8

(51) Int. Cl.
*F25D 23/02* (2006.01)
*E05D 3/18* (2006.01)
*E05D 7/081* (2006.01)

(52) U.S. Cl.
CPC ............. *F25D 23/028* (2013.01); *E05D 3/18* (2013.01); *E05D 7/081* (2013.01); *E05Y 2900/31* (2013.01); *F25D 2323/024* (2013.01)

(58) Field of Classification Search
CPC ............. F25D 2323/024; F25D 23/028; E05Y 2900/31; E05D 3/18; E05D 7/081
See application file for complete search history.

(56) References Cited

U.S. PATENT DOCUMENTS 1,075,130 A 10/1913 Ackerman et al.
1,832,174 A 11/1931 Zahner
(Continued)

FOREIGN PATENT DOCUMENTS

AU 6554996 A 3/1998
CN 1432781 A 7/2003
(Continued)

OTHER PUBLICATIONS

Chinese Second Office Action, Chinese Application No. 202111275426.4, mailed Apr. 30, 2025 (10 pages).
(Continued)

*Primary Examiner* — Andrew Roersma
(74) *Attorney, Agent, or Firm* — K&L Gates LLP

(57) ABSTRACT

The present application provides a box device, including a box body, a door body and a hinge assembly. The hinge assembly is provided with a first sliding rail and a second sliding rail, and the first sliding rail and the second sliding rail linearly extend. When the door body blocks an opening, the first sliding rail is perpendicular to the plane where the opening is located, and the second sliding rail is obliquely
(Continued)

arranged with respect to the plane where the opening is located, and during a process from blocking the opening by the door body to opening the door body relative to the box body, the extent to which the door body exceeds an outer side wall of the box body reduces when the door body moves to a target side of the box body.

14 Claims, 12 Drawing Sheets

(56) References Cited

U.S. PATENT DOCUMENTS

| | | | | |
|---|---|---|---|---|
| 2,793,387 | A | 5/1957 | Odell | |
| 2,867,839 | A | 1/1959 | Squire | |
| 2,975,013 | A * | 3/1961 | Wallace | E05D 3/022 16/354 |
| 3,001,225 | A | 9/1961 | Squire | |
| 3,065,498 | A | 11/1962 | Johnson | |
| 3,083,403 | A * | 4/1963 | Noord | E05D 3/18 16/361 |
| 4,485,524 | A | 12/1984 | Neville | |
| 4,741,433 | A | 5/1988 | Irvine | |
| 4,912,865 | A | 4/1990 | Ellsworth et al. | |
| 6,493,906 | B2 | 12/2002 | Matteau | |
| 7,192,104 | B2 * | 3/2007 | Tarantik | E05F 1/1284 312/319.2 |
| 8,303,059 | B2 | 11/2012 | Darney | |
| 8,338,767 | B2 | 12/2012 | Kulkarni | |
| 9,376,845 | B2 * | 6/2016 | Sawaguchi | E05D 3/022 |
| 12,055,337 | B2 | 8/2024 | Li et al. | |
| 12,497,216 | B2 * | 12/2025 | Fang | B65D 43/163 |
| 12,584,337 | B2 * | 3/2026 | Fang | E05D 7/081 |
| 2003/0132689 | A1 | 7/2003 | Shin | |
| 2006/0070212 | A1 | 4/2006 | Morgan | |
| 2008/0301909 | A1 | 12/2008 | Chien et al. | |
| 2011/0192839 | A1 | 8/2011 | Kulkarni | |
| 2012/0025686 | A1 | 2/2012 | Darney | |
| 2012/0043873 | A1 | 2/2012 | Kim et al. | |
| 2016/0123654 | A1 | 5/2016 | Lee et al. | |
| 2020/0124342 | A1 | 4/2020 | Zhang et al. | |
| 2020/0284076 | A1 | 9/2020 | Elkasevic | |
| 2022/0259904 | A1 | 8/2022 | Xia et al. | |
| 2022/0259907 | A1 | 8/2022 | Xia et al. | |

FOREIGN PATENT DOCUMENTS

| | | | | |
|---|---|---|---|---|
| CN | 202792778 | U | 3/2013 | |
| CN | 202913834 | U | 5/2013 | |
| CN | 103162499 | A | 6/2013 | |
| CN | 106066108 | A | 11/2016 | |
| CN | 106196819 | A | 12/2016 | |
| CN | 106819620 | A | 6/2017 | |
| CN | 106839620 | A | 6/2017 | |
| CN | 206319754 | U | 7/2017 | |
| CN | 108468488 | A | 8/2018 | |
| CN | 109470014 | A | 3/2019 | |
| CN | 107289719 | B | 5/2020 | |
| CN | 111734244 | A | 10/2020 | |
| CN | 112282538 | A | 1/2021 | |
| CN | 112282539 | A | 1/2021 | |
| CN | 112282540 | A | 1/2021 | |
| CN | 112282542 | A | 1/2021 | |
| CN | 112282543 | A | 1/2021 | |
| CN | 112282547 | A | 1/2021 | |
| CN | 112282549 | A | 1/2021 | |
| CN | 112284018 | A | 1/2021 | |
| CN | 112360267 | A | 2/2021 | |
| CN | 112444060 | A | 3/2021 | |
| CN | 112444064 | A | 3/2021 | |
| CN | 112444076 | A | 3/2021 | |
| CN | 112444086 | A | 3/2021 | |
| CN | 112444091 | A | 3/2021 | |
| CN | 112595011 | A | 4/2021 | |
| CN | 112878829 | A | 6/2021 | |
| CN | 112964012 | A | 6/2021 | |
| CN | 213477968 | U | 6/2021 | |
| CN | 213477969 | U | 6/2021 | |
| CN | 113513227 | A | 10/2021 | |
| CN | 113530388 | A | 10/2021 | |
| CN | 215930235 | U | 3/2022 | |
| CN | 215978928 | U | 3/2022 | |
| CN | 119664198 | A | 3/2025 | |
| DE | 7639018 | U1 | 4/1977 | |
| DE | 3530199 | A1 | 5/1986 | |
| DE | 20006692 | U1 | 8/2001 | |
| DE | 102008021338 | A1 | 11/2009 | |
| DE | 102011052468 | A1 | 2/2013 | |
| DE | 102016004996 | B3 | 8/2017 | |
| EP | 0398197 | A1 | 11/1990 | |
| EP | 0703336 | A1 | 3/1996 | |
| EP | 1327841 | A2 | 7/2003 | |
| EP | 1327842 | A2 | 7/2003 | |
| EP | 2348633 | A7 | 7/2011 | |
| EP | 2481873 | A1 | 8/2012 | |
| EP | 3333516 | A | 6/2018 | |
| EP | 3333516 | A1 | 6/2018 | |
| EP | 3741942 | A1 | 11/2020 | |
| GB | 2064642 | A * | 6/1981 | E05D 7/081 |
| JP | 1983148380 | A | 8/1984 | |
| JP | 1996090076 | A | 4/1996 | |
| JP | H1054648 | A | 2/1998 | |
| JP | 2000038870 | A | 2/2000 | |
| JP | 2001336335 | A | 12/2001 | |
| JP | 2002276232 | A | 9/2002 | |
| JP | 2008249325 | A | 10/2008 | |
| JP | 2009097812 | A | 5/2009 | |
| JP | 2020521108 | A | 7/2020 | |
| JP | 2020521932 | A | 7/2020 | |
| JP | 2020159444 | A | 10/2020 | |
| JP | 2022542110 | A | 9/2022 | |
| KR | 20110045468 | A | 5/2011 | |
| KR | 20140002466 | A | 1/2014 | |
| KR | 20210000434 | A | 1/2021 | |
| KR | 20210081010 | A | 7/2021 | |
| WO | 2011080109 | A2 | 7/2011 | |
| WO | 2011100287 | A1 | 8/2011 | |
| WO | 2014073432 | A1 | 5/2014 | |
| WO | 2021012655 | A1 | 1/2021 | |
| WO | 2021037117 | A1 | 3/2021 | |

OTHER PUBLICATIONS

Japanese First Notice of Reasons for Refusal, Japanese Patent Application No. 2024-524722, mailed May 20, 2025 (6 pages).

Japanese First Notice of Reasons for Refusal,Japanese Patent Application No. 2024-524720, mailed Apr. 22, 2025 (12 pages).

US Non Final OA/Final OA, U.S. Appl. No. 18/704,924, mailed Jun. 30, 2025 (12 pages).

Japanese Decision of Refusal, Japanese Patent Application No. 2024-524721, mailed Jul. 29, 2025 (4 pages).

Japanese Second Notice of Reasons for Refusal,Japanese Patent Application No. 2024-524722, mailed Sep. 9, 2025 (4 pages).

European Second Examination Report ,European Application No. 22885330.5, mailed Oct. 9, 2025 (6 pages).

US Non Final OA, U.S. Appl. No. 18/704,461, mailed Sep. 11, 2025 (65 pages).

US Non Final OA, U.S. Appl. No. 18/704,445, mailed Sep. 10, 2025 (36 pages).

US Non Final OA, U.S. Appl. No. 18/704,060, mailed Sep. 10, 2025 (14 pages).

US Non Final OA, U.S. Appl. No. 18/704,886, mailed Sep. 10, 2025 (15 pages).

US Non Final OA, U.S. Appl. No. 18/704,907, mailed Sep. 10, 2025 (14 pages).

US Non Final OA, U.S. Appl. No. 18/704,938, mailed Sep. 10, 2025 (19 pages).

The First Office Action received in the counterpart Chinese Application 202111275426.4, mailed on Oct. 23, 2024, 14 pages with English translation.

(56) References Cited

OTHER PUBLICATIONS

Notice of Reasons for Refusal received in the counterpart Japanese Application 2024-524718, mailed on Mar. 25, 2025, 14 pages with English translation.
Notice of Reasons for Refusal received in the counterpart Japanese Application 2024-524719, mailed on Mar. 18, 2025, 6 pages with English translation.
Notice of Reasons for Refusal received in the counterpart Japanese Application 2024-524717, mailed on Mar. 25, 2025, 10 pages with English translation.
Notice of Reasons for Refusal received in the counterpart Japanese Application 2024-524716, mailed on Mar. 25, 2025, 14 pages with English translation.
Notice of Reasons for Refusal received in the counterpart Japanese Application 2024-524721, mailed on Mar. 11, 2025, 12 pages with English translation.
Notice of Reasons for Refusal received in the counterpart Japanese Application 2024-524715, mailed on Apr. 15, 2025, 6 pages with English translation.
The extended European search report received in the counterpart EP application 22885331.3, mailed on Jan. 17, 2025, 11 pages.
The extended European search report received in the counterpart EP application 22885333.9, mailed on Jan. 27, 2025, 11 pages.
The extended European search report received in the counterpart EP application 22885330.5, mailed on Jan. 27, 2025, 9 pages.
The extended European search report received in the counterpart EP application 22885332.1, mailed on Jan. 29, 2025, 11 pages.
The extended European search report received in the counterpart EP application 22885337.0, mailed on Jan. 29, 2025, 10 pages.
The extended European search report received in the counterpart EP application 22885335.4, mailed on Jan. 31, 2025, 8 pages.
The extended European search report received in the counterpart EP application 22885336.2, mailed on Jan. 31, 2025, 11 pages.
The extended European search report received in the counterpart EP application 22885334.7, mailed on Feb. 3, 2025, 7 pages.
ISR received in PCT/CN2022/113128; mailed Nov. 10, 2022.
ISR received in PCT/CN2022/113123; mailed Nov. 4, 2022.
ISR received in PCT/CN2022/113130; mailed Nov. 1, 2022.
ISR received in PCT/CN2022/113131; mailed Oct. 25, 2022.
ISR received in PCT/CN2022/113132; mailed Oct. 27, 2022.
ISR received in PCT/CN2022/113121; mailed Nov. 1, 2022.
ISR received in PCT/CN2022/113126; mailed Nov. 30, 2022.
ISR received in PCT/CN2022/113120; mailed Nov. 17, 2022.
European Second Examination Report ,European Application No. 22885331.3, mailed Dec. 16, 2025 (6 pages).
Chinese First Office Action,Chinese Application No. 202111275431.5, mailed Jan. 29, 2026 (16 pages).
Chinese First Office Action,Chinese Application No. 202111275446.1, mailed Jan. 29, 2026 (16 pages).
US Notice of Allowance, U.S. Appl. No. 18/704,461, mailed Jan. 14, 2026 (8 pages).
US Final office action, U.S. Appl. No. 18/704,938, mailed Feb. 2, 2026 (21 pages).
US Final office action, U.S. Appl. No. 18/704,060, mailed Jan. 21, 2026 (15 pages).
US Final office action, U.S. Appl. No. 18/704,907, mailed Jan. 20, 2026 (15 pages).
US Final office action, U.S. Appl. No. 18/704,886, mailed Jan. 20, 2026 (14 pages).
US Final office action, U.S. Appl. No. 18/704,445, mailed Jan. 21, 2026 (15 pages).
Japanese Decision of Rejection, Japanese Application No. 2024-524715, mailed Nov. 4, 2025 (5 pages).
European Third Examination Report ,European Application No. 22885330.5, mailed Apr. 20, 2026 (5 pages).
Chinese First Office Action,Chinese Application No. 202111272473.3, mailed Apr. 27, 2026 (20 pages).
Chinese First Office Action,Chinese Application No. 202111275429.8, mailed Apr. 28, 2026 (22 pages).
Chinese First Office Action,Chinese Application No. 202111272475.2, mailed Apr. 27, 2026 (20 pages).
Chinese First Office Action,Chinese Application No. 202111272484.1, mailed Apr. 27, 2026 (22 pages).
Chinese First Office Action,Chinese Application No. 202111275427.9, mailed Apr. 29, 2026 (19 pages).
US Non Final office action, U.S. Appl. No. 18/704,938, mailed Aug. 11, 2026 (21 pages).

* cited by examiner

BOX DEVICE

CROSS-REFERENCES TO RELATED APPLICATIONS

The present disclosure is a national phase application of International Application No. PCT/CN2022/113128, filed on Aug. 17, 2022, which claims priority to Chinese Patent Application No. 202111275429.8 filed Oct. 29, 2021, both of which are hereby incorporated by reference in its entirety.

FIELD

The present disclosure relates to the field of hinges, and in particular to a box device.

BACKGROUND

A box device includes a door body and a box body. When the door body is opened relative to the box body, the door body may exceed an outer sidewall of the box device, which may cause interference between the door body and an installation environment of the box device. For example, in the case of embedded installation of the box device, a part of the door body exceeding the outer sidewall of the box device may interfere with a wall embedded by the box device.

SUMMARY

A problem to be solved by the present disclosure is to provide a box device, which may reduce the risk of interference and collision of the door body during rotating the door body.

In order to solve the above problem, an embodiment adopted by the present disclosure is to provide a box device. The box device includes a box body internally defining an accommodating space with an opening. The box device further includes a door body configured to block the opening. The box device further includes a hinge assembly disposed on a pivoting side of the box body and pivotally connecting the box body to the door body. The hinge assembly comprises a first connecting member and a second connecting member, the first connecting member is disposed on one of the box body and the door body, and the second connecting member is disposed on the other of the box body and the door body. The first connecting member is at least provided with a first sliding shaft and a second sliding shaft, and the second connecting member is at least provided with a first sliding rail and a second sliding rail. The first sliding shaft is connected to the first sliding rail and is able to move along the first sliding rail, and the second sliding shaft is connected to the second sliding rail and is able to move along the second sliding rail. The first sliding rail and the second sliding rail linearly extends; when the door body blocks the opening, the first sliding rail is perpendicular to a plane where the opening is located, and the second sliding rail tilts relative to the plane where the opening is located, and the door body moves towards a target side of the box body during a process from blocking the opening by the door body to opening the door body relative to the box body; and the opening comprises two opposite sides, the pivoting side is disposed on one of the two opposite sides, and the target side is disposed on the other of the two opposite sides.

In some embodiments, the first sliding rail intersects with the second sliding rail to form an intersection point.

In some embodiments, the first sliding shaft and the second sliding shaft are away from the opening relative to the intersection point when the door body blocks the opening, and a connecting line between the first sliding shaft and the second sliding shaft is perpendicular to the second sliding rail.

In some embodiments, the second sliding rail extends along a direction close to the pivoting side and a direction away from the box body when the door body blocks the opening.

In some embodiments, the second sliding rail extends along a direction close to the target side and a direction away from the box body when the door body blocks the opening.

In some embodiments, the first connecting member is further provided with a third sliding shaft, and the second connecting member is further provided with a third sliding rail; the third sliding shaft is connected to the third sliding rail and is able to move along the third sliding rail, and the third sliding rail linearly extends; and the third sliding rail tilts relative to the plane where the opening is located and the second sliding rail when the door body blocks the opening.

In some embodiments, the first sliding rail intersects with the second sliding rail and the third sliding rail, to form an intersection point.

In some embodiments, the third sliding shaft is away from the opening relative to the intersection point when the door body blocks the opening, and a connecting line between the first sliding shaft and the third sliding shaft is perpendicular to the third sliding rail.

In some embodiments, the third sliding rail extends along a direction close to the pivoting side and a direction away from the box body when the door body blocks the opening.

In some embodiments, the third sliding rail extends along a direction close to the target side and a direction away from the box body when the door body blocks the opening.

In some embodiments, an end surface of the door body facing the hinge assembly has an inner edge, an outer edge, and a side edge; the inner edge and the outer edge are disposed at intervals along the first direction and extend along the second direction, the inner edge is connected to the outer edge by the side edge, the side edge extends along the first direction, and the first direction is perpendicular to the second direction; and the inner edge is close to the box body relative to the outer edge when the door body blocks the opening, and the first direction is perpendicular to the plane where the opening is located. Minimum distances from any one of the first sliding rail, the second sliding rail, and the third sliding rail to the inner edge, the outer edge, and the side edge are greater than or equal to 6 mm.

In some embodiments, the first sliding rail where the first sliding shaft is located has a first tangent, the second sliding rail where the second sliding shaft is located has a second tangent, and an included angle between the first tangent and the second tangent is greater than or equal to 10°.

In some embodiments, the second connecting member defines a reference circle, a center line of the first sliding rail intersects with a center line of the second sliding rail at a center of the reference circle.

In some embodiments, an end surface of the door body facing the hinge assembly has a side edge; when the door body blocks the opening, the side edge is perpendicular to the plane where the opening is located; and a radius of the reference circle is defined as R, a distance from the center of the reference circle to the side edge is defined as N, and $R \leq N \leq 100$ mm.

In some embodiments, an end surface of the door body facing the hinge assembly has a side edge; when the door body blocks the opening, the side edge is perpendicular to the plane where the opening is located; and a distance from the center of the reference circle to the side edge is defined as N, and 15 mm≤N≤100 mm.

In some embodiments, an end surface of the door body facing the hinge assembly comprises an inner edge and an outer edge, the inner edge and the outer edge are disposed at intervals along a first direction and extend along a second direction, the first direction is perpendicular to the second direction, and the inner edge is close to the box body relative to the outer edge when the door body blocks the opening.

In some embodiments, the end surface of the door body facing the hinge assembly further comprises a side edge, the inner edge is connected to the outer edge by the side edge, and the side edge extends along the first direction.

In some embodiments, a radius of the reference circle is defined as R, a length of the side edge in the first direction is defined as D, a distance from the center of the reference circle to the outer edge is defined as W, and R≤W≤(½) D.

In some embodiments, a radius of the reference circle is defined as R, a length of the side edge in the first direction is defined as D, a distance from the center of the reference circle to the outer edge is defined as W, and R≤W≤D.

In some embodiments, a length of the door body in the first direction is defined as H, and 35 mm≤H≤100 mm; a length of the door body in the second direction is defined as L, and 300 mm≤L≤700 mm; a radius of the reference circle is defined as R, and R=(⅓) H; a minimum distance from the reference circle to the outer edge is defined as M, and 0 mm≤M≤15 mm.

Different from the related art, the effects of the present disclosure are as follows. The hinge assembly of the box device of the present disclosure is provided with the first sliding rail and the second sliding rail. The first sliding rail and the second sliding rail linearly extend. When the door body blocks the opening, the first sliding rail is perpendicular to a plane where the opening is located, and the second sliding rail tilts relative to the plane where the opening is located, and the door body moves towards the target side of the box body during the process from blocking the opening by the door body to opening the door body relative to the box body. Therefore, the degree of the door body exceeding the outer sidewall of the box body is reduced, which may reduce the risk of interference or collision between the door body and an external structure during rotating the door body.

BRIEF DESCRIPTION OF THE DRAWINGS

The accompanying drawings here are incorporated into the specification and form a part of the present specification. These accompanying drawings illustrate embodiments in accordance with the present disclosure and are configured together with the specification to explain the principles of the present disclosure. In addition, these accompanying drawings and textual descriptions are not intended to limit the scope of the concept of the present disclosure in any way, but to illustrate the concept of the present disclosure.

DETAILED DESCRIPTION OF THE DISCLOSURE

In order to make the embodiments of the present disclosure clearer, some embodiments of the present disclosure are clearly and completely described in conjunction with accompanying drawings in some embodiments of the present disclosure. The described embodiments are only a part of the embodiments of the present disclosure, and not all embodiments. In the case of no conflict, the following embodiments and features in the embodiments may be combined with each other.

Basic Structure

Figure 1:
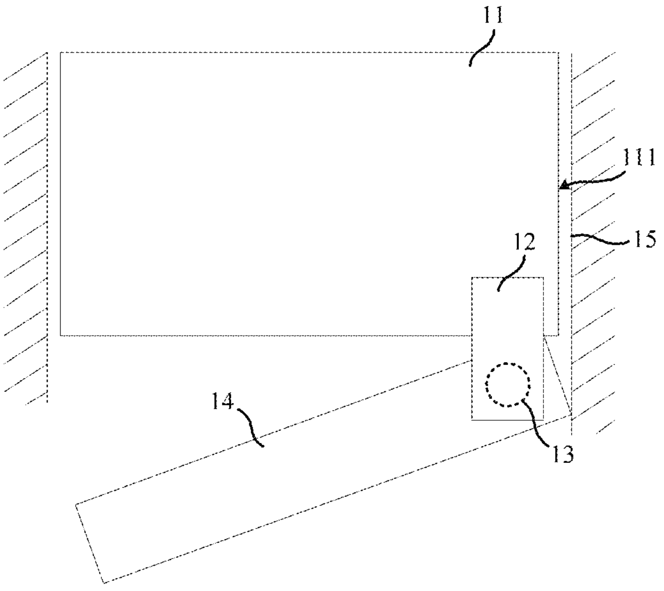
FIG. 1 is a structural schematic view of a refrigeration device in a related art.

As illustrated in FIG. 1, FIG. 1 is a structural schematic view of a refrigeration device in a related art.

In the related art, a hinge structure is configured for opening and closing a door body of a refrigeration device such as a refrigerator, and usually adopts a single hinge shaft design. For example, a box body 11 of a refrigerator 10 is provided with a hinge fixing plate 12, and the hinge fixing plate 12 is provided with a hinge shaft 13. A door body 14 of the refrigerator 10 defines a shaft hole (not shown in drawing). The hinge shaft 13 is inserted into the shaft hole, and the hinge shaft 13 may rotate in the shaft hole, and the door body 14 may rotate relative to the box body 11, to achieve the opening and closing of the door body 14.

As the home decoration style gradually tends to be integrated, concealed, and simple, the embedded installation of the refrigerator 10 also emerges as the times require. For example, the refrigerator 10 is embedded in a cabinet 15. However, limited by the existing hinge structure adopting the single hinge shaft design, the door body 14 exceeds an outer sidewall 111 of the box body 11 during rotating the door body 14 relative to the box body 11. During rotating the door body 14, there is a risk of interference or collision between the door body 14 and an external structure (such as the cabinet 15).

Therefore, the embodiments of the present disclosure provide a box device, which may reduce the extent to which the door body exceeds the outer sidewall of the box body during rotating the door body, and may be described in detail below.

Figure 2:
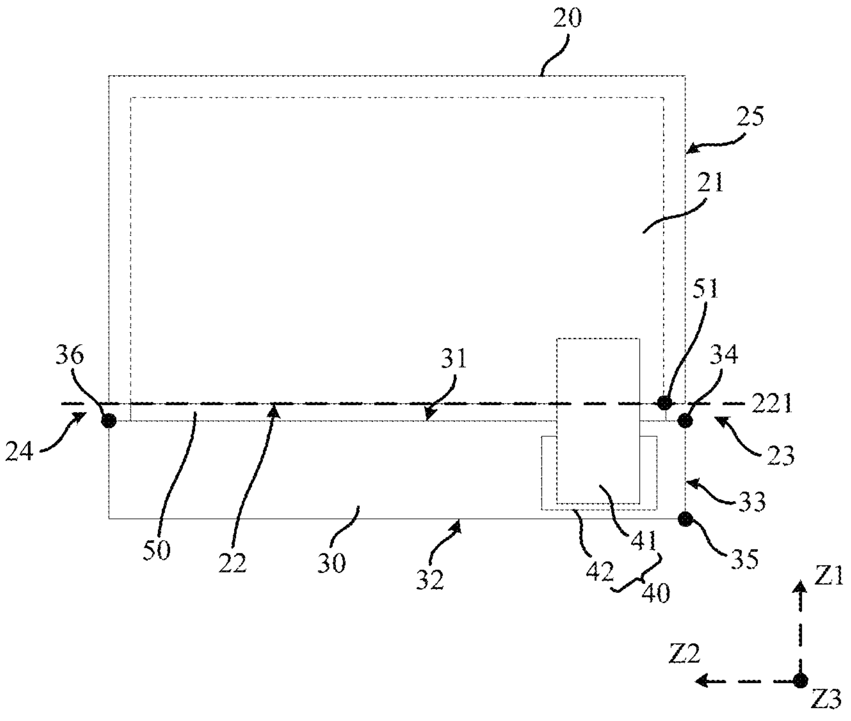
FIG. 2 is a structural schematic view of a box device in some embodiments of the present disclosure.

As illustrated in FIG. 2, FIG. 2 is a structural schematic view of a box device in some embodiments of the present disclosure.

In some embodiments, the box device may be the refrigeration device, such as, the refrigerator or a freezer. In some embodiments, the box device may also be other devices that include the box body 20 and the door body 30, and the door body 30 may be rotated relative to the box body 20. Hereinafter, the box device being the refrigerator is taken as an example for illustration, which is only for the purpose of discussion, and does not limit the specific form or structure of the box device.

The box device includes the box body 20. The box body 20 is a storage medium of the box device, and a user stores objects to be refrigerated or frozen in the box body 20. In some embodiments, an accommodating space 21 is defined in the box body 20, the accommodating space 21 has an opening 22, and the objects to be refrigerated or frozen are stored in the accommodating space 21.

The box device further includes the door body 30 configured for sealing the opening 22 of the accommodation space 21. When the door body 30 blocks the opening 22, that is, the door body 30 is in a closed state, and a relatively closed space is formed inside the box body 20 configured for storing the objects. The door body 30 is rotatably connected to a pivoting side 23 of the box body 20, that is, the door body 30 may rotate relative to the box body 20. The box body 20 also includes a target side 24, and the pivoting side 23 and the target side 24 are respectively disposed on two opposite sides of the opening 22.

The box device further includes a hinge assembly 40. The hinge assembly 40 is disposed on the pivoting side 23 of the box body 20, and the hinge assembly 40 is pivotally connected to the box body 20 and the door body 30, to achieve a rotational connection between the box body 20 and the door body 30. In some embodiments, the hinge assembly 40 includes a first connecting member 41 and a second connecting member 42. The first connecting member 41 is disposed on one of the box body 20 and the door body 30, and the second connecting member 42 is disposed on the other of the box body 20 and the door body 30. The first connecting member 41 is provided with a sliding shaft, and the second connecting member 42 is provided with a sliding rail. The sliding shaft is connected to the sliding rail, and the sliding shaft may move along the sliding rail. During rotating the door body 30 relative to the box body 20, the sliding shaft moves along the sliding rail.

The first connecting member 41 and the second connecting member 42 may be parts of the box body 20 and the door body 30, that is, the first connecting member 41 and the second connecting member 42 may be integrated with the box body 20 and the door body 30. In some embodiments, when the first connecting member 41 is disposed on the box body 20 and the second connecting member 42 is disposed on the door body 30, the first connecting member 41 may be integrated with the box body 20, and the second connecting member 42 may be integrated with the door body 30. When the sliding rail is in a form of a groove, a surface of the door body 30 is recessed to directly form the sliding rail, and the sliding shaft is embedded in the sliding rail. In this case, the door body 30 on the position of the sliding rail may be understood as the second connecting member 42.

In some embodiments, an end surface of the door body 30 facing the hinge assembly 40 includes an inner edge 31, an outer edge 32, and a side edge 33. The inner edge 31 and the outer edge 32 are disposed at intervals along a first direction Z1, and both extend along a second direction Z2. When the door body 30 blocks the opening 22, the inner edge 31 is closer to the box body 20 relative to the outer edge 32. The side edge 33 is located on the pivoting side 23. The inner edge 31 is connected to the outer edge 32 by the side edge 33, and the side edge 33 extends along the first direction Z1. When the door body 30 blocks the opening 22, the side edge 33 is perpendicular to a plane 221 where the opening 22 is located.

The door body 30 includes a first inner side edge 34 and an outer side edge 35 on the pivoting side 23. The first inner side edge 34 and the outer side edge 35 are disposed at intervals along the first direction Z1, and both extend along a third direction Z3. When the door body 30 blocks the opening 22, the first inner side edge 34 is closer to the box body 20 than the outer side edge 35. The first inner side edge 34 is connected to an intersection point of the inner edge 31 and the side edge 33. The outer side edge 35 is connected to an intersection point of the outer edge 32 and the side edge 33.

The door body 30 further includes a second inner side edge 36 away from the pivoting side 23. The second inner side edge 36 extends along the third direction Z3. When the door body 30 blocks the opening 22, a plane where both the first inner side edge 34 and the second inner side edge 36 are located is parallel to the plane 221 where the opening 22 is located. The user usually grasps the side of the door body 30 away from the pivoting side 23 to open the door body 30.

Any two of the first direction Z1, the second direction Z2, and the third direction Z3 are perpendicular to each other. When the box device is correctly placed, both the first direction Z1 and the second direction Z2 are horizontal, and the third direction Z3 is vertical. The pivoting side 23 and the target side 24 are disposed opposite to each other along the second direction Z2. In FIG. 2, the third direction Z3 is perpendicular to a drawing paper, therefore the third direction Z3 appears as a dot in FIG. 2. Similarly, each of the first inner side edge 34, the outer side edge 35, and the second inner side edge 36 appears as a dot in FIG. 2.

In some embodiments, the box device further includes a door seal 50 disposed on the door body 30. The door body 30 blocks the opening 22 of the accommodating space 21 through the door seal 50, and the accommodating space 21 may have a good sealing effect when the door body 30 blocks the opening 22. The door seal 50 includes a third inner side edge 51 on the pivoting side 23, the third inner side edge 51 extends along the third direction Z3, and the third inner side edge 51 is spaced apart from the door body 30. Similarly, the third inner side edge 51 appears as a dot in FIG. 2.

The box device in the embodiments of the present disclosure may adopt the design of single door, double door, or even more doors 30. The box device is provided with an independent accommodating space 21 corresponding to each door body 30. That is, the door body 30 corresponds to the accommodating space 21 one by one, and the door body 30 is configured to seal the corresponding accommodation space 21.

Matching of Straight Sliding Rails

Figure 3:
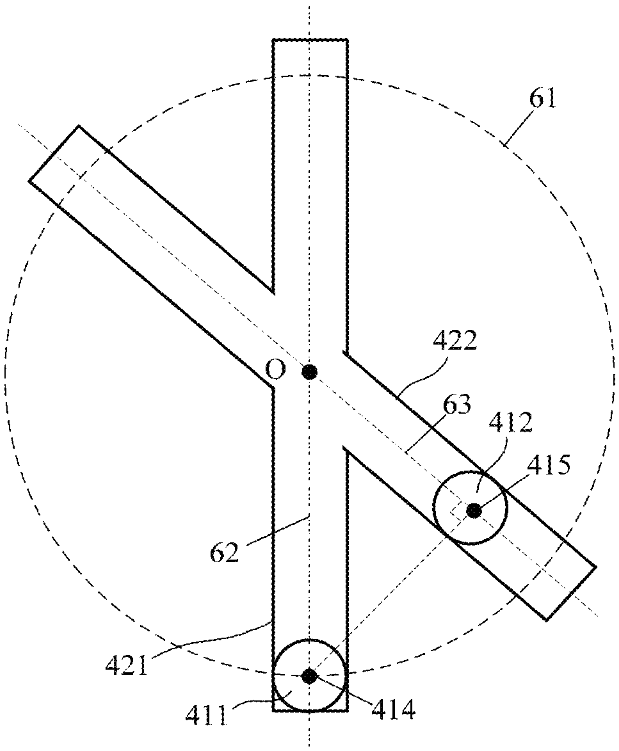
FIG. 3 is a structural schematic view illustrating a sliding shaft and a sliding rail in a first embodiment of the present disclosure.

As illustrated in FIG. 2 and FIG. 3, FIG. 3 is a structural schematic view illustrating a sliding shaft and a sliding rail in a first embodiment of the present disclosure.

In some embodiments, the first connecting member 41 is provided with at least a sliding shaft 411 and a sliding shaft 412, and the second connecting member 42 is provided with at least a sliding rail 421 and a sliding rail 422. The sliding shaft 411 is connected to the sliding rail 421 and may move along the sliding rail 421. The sliding shaft 412 is connected to the sliding rail 422 and may move along the sliding rail 422.

Each of the sliding rail 421 and the sliding rail 422 linearly extends. When the door body 30 blocks the opening 22, the sliding rail 421 is perpendicular to the plane 221 where the opening 22 is located, and the sliding rail 422 tilts relative to the plane 221 where the opening 22 is located. Thus, during the process from blocking the opening 22 by the door body 30 to opening the door body 30 relative to the box body 20, the door body 30 moves towards the target side 24 of the box body 20.

In some embodiments, the second connecting member 42 defines a reference circle 61, a first reference line 62, and a second reference line 63. The reference circle 61, the first reference line 62, and the second reference line 63 are coplanar. The first reference line 62 and the second reference line 63 intersect on a center O of the reference circle 61. When the door body 30 blocks the opening 22, the first reference line 62 is perpendicular to the plane 221 where the opening 22 is located.

The sliding rail 421 linearly extends along the first reference line 62, and the sliding rail 422 linearly extends along the second reference line 63. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to a micro-slit or even seamless level, which facilitates the embedded installation of the box device.

The extension of the sliding rail along the reference line means that a center line of the sliding rail coincides with the reference line.

In some embodiments, the sliding rail 421 and the sliding rail 422 intersect to form an intersection point. When the door body 30 blocks the opening 22, the sliding shaft 411 and the sliding shaft 412 are both away from the opening 22 relative to the intersection point. A connecting line between the sliding shaft 411 and the sliding shaft 412 is perpendicular to the sliding rail 422.

In some embodiments, when the door body 30 blocks the opening 22, the door body 30 is in the closed state at this time. A minimum distance from a central axis 414 of the sliding shaft 411 to the plane 221 where the opening 22 is located and a minimum distance from a central axis 415 of the sliding shaft 412 to the plane 221 where the opening 22 is located are greater than or equal to a minimum distance from the center O of the reference circle 61 to the plane 221 where the opening 22 is located. The central axis 414 of the sliding shaft 411 is located on an intersection point of the first reference line 62 and the reference circle 61. That is, a starting point of the sliding shaft 411 is located on the intersection point of the first reference line 62 and the reference circle 61. The central axis 415 of the sliding shaft 412 and the second reference line 63 form the intersection point, the first reference line 62 and the reference circle 61 form the intersection point, and a connecting line between these two intersection points is perpendicular to the second reference line 63. That is, a connecting line between the starting point of the sliding shaft 412 and the intersection point of the first reference line 62 and the reference circle 61 is perpendicular to the second reference line 63.

The central axis 414 of the sliding shaft 411 and the central axis 415 of the sliding shaft 412 are both perpendicular to the paper surface shown in the drawings of the present disclosure. Therefore, the central axis 414 of the sliding shaft 411 and the central axis 415 of the sliding shaft 412 appear as dots in the drawings of the present disclosure.

Figure 4:
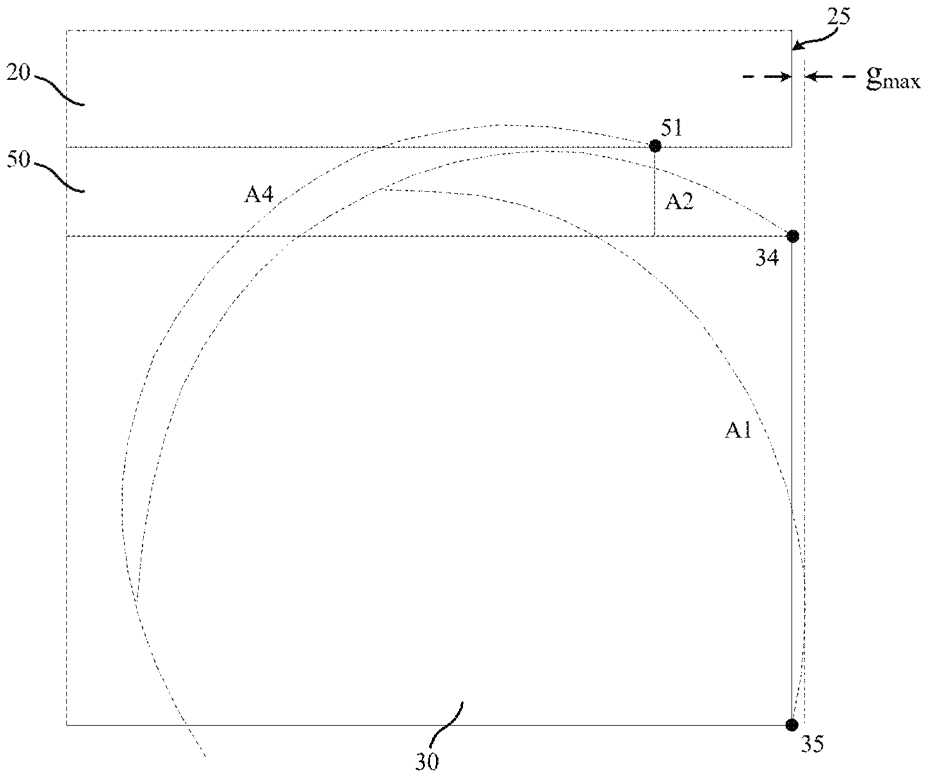
FIG. 4 is a structural schematic view of a part of the box device shown in FIG. 2.
Figure 5:
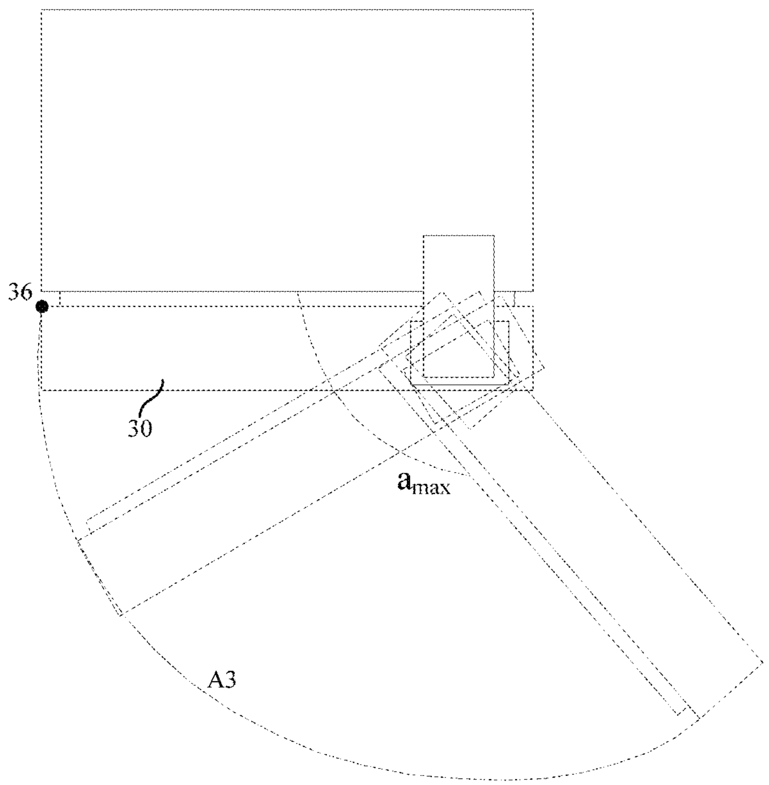
FIG. 5 is a structural schematic view illustrating a process of opening a door body in some embodiments of the present disclosure.

Through the above modes, under the action of the hinge assembly 40, during the process from blocking the opening 22 by the door body 30 to opening the door body 30 relative to the box body 20, the door body 30 may move according to a set trajectory. In some embodiments, as illustrated in FIGS. 4 and 5, the outer side edge 35 of the door body 30 may move according to a trajectory A1, the first inner side edge 34 may move according to a trajectory A2, and the second inner side edge 36 may move according to a trajectory A3. The third inner side edge 51 of the door seal 50 may move according to a trajectory A4.

When the box device adopts an embedded installation mode, it is generally required in the industry that a distance between the box device and the external structure located next to the box device is less than or equal to 4 mm, and the maximum opening angle of the door body 30 needs to be greater than or equal to 90°. In some embodiments, the door body 30 of the box device moves according to the set trajectory, which may ensure that the maximum distance $g_{max}$ that the outer side edge 35 of the door body 30 exceeds the outer sidewall 25 of the box body 20 is less than or equal to 4 mm, and may ensure that the maximum opening angle $a_{max}$ of the door body 30 is greater than or equal to 90°. In some embodiments, the maximum opening angle $a_{max}$ of the door body 30 may be 150°, which may meet the requirements.

In some embodiments, when the door body 30 blocks the opening 22, the sliding rail 422 extends along a direction close to the pivoting side 23 and away from the box body 20. The sliding shaft 412 is located on the side of the first reference line 62 away from the target side 24. That is, the starting point of the sliding shaft 412 is located on the side of the first reference line 62 away from the target side 24, as illustrated in FIG. 3. In one embodiment, when the door body 30 blocks the opening 22, the sliding rail 422 extends along a direction close to the target side 24 and away from the box body 20. The sliding shaft 412 is located on the side of the first reference line 62 facing the target side 24. That is, the starting point of the sliding shaft 412 is located on the side of the first reference line 62 facing the target side 24. In this way, under the action of the hinge assembly 40, during the process from blocking the opening 22 by the door body 30 to opening the door body 30 relative to the box body 20, the door body 30 may move according to the set trajectory.

Figure 6:
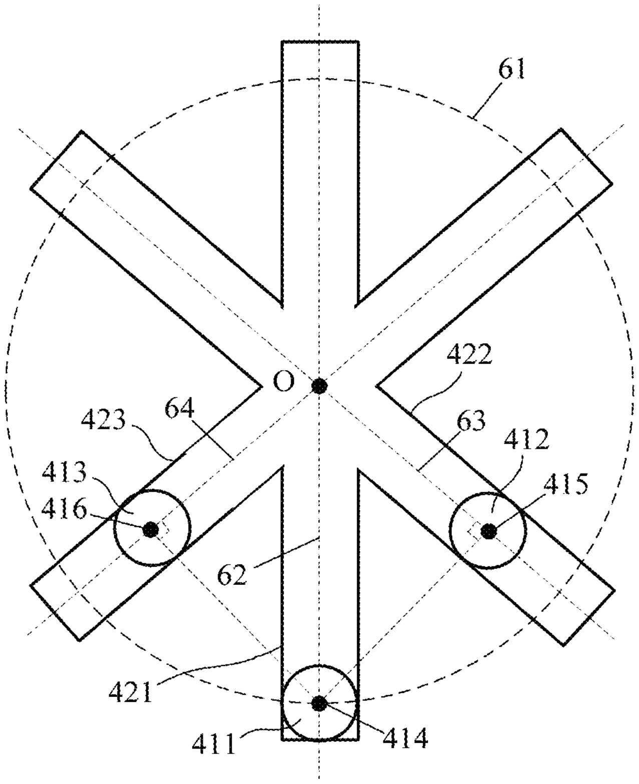
FIG. 6 is a structural schematic view illustrating the sliding shaft and the sliding rail in a second embodiment of the present disclosure.

As illustrated in FIG. 6, FIG. 6 is a structural schematic view illustrating the sliding shaft and the sliding rail in a second embodiment of the present disclosure.

In some embodiments, the first connecting member 41 is further provided with a sliding shaft 413, and the second connecting member 42 is further provided with a sliding rail 423. The sliding shaft 413 is connected to the sliding rail 423 and may move along the sliding rail 423. The sliding rail 423 linearly extends. When the door body 30 blocks the opening 22, the sliding rail 423 tilts relative to the plane 221 where the opening 22 is located and the sliding rail 422.

In some embodiments, the second connecting member 42 further defines a third reference line 64, and the third reference line 64 is coplanar with the reference circle 61. The third reference line 64 intersects the first reference line 62 and the second reference line 63 on the center O of the reference circle 61, respectively.

The central axis 416 of the sliding shaft 413 is perpendicular to the paper surface shown in the drawings of the present disclosure, therefore the central axis 416 of the sliding shaft 413 appears as the dot in the drawings of the present disclosure.

Through the above modes, at any moment, at least two of a moving direction of the sliding shaft 411, a moving direction of the sliding shaft 412, and a moving direction of the sliding shaft 413 are different. Thus, it may avoid the unstable movement of the door body 30 that is caused by the sliding shaft 411, the sliding shaft 412, and the sliding shaft 413 having the same moving direction at a certain moment, which facilitates the stability of the movement of the door body 30.

In some embodiments, the sliding rail 421, the sliding rail 422, and the sliding rail 423 intersect to form the intersection point. When the door body 30 blocks the opening 22, the sliding shaft 413 is away from the opening 22 relative to the intersection point. A connecting line between the sliding shaft 411 and the sliding shaft 413 is perpendicular to the sliding rail 423.

In some embodiments, when the door body 30 blocks the opening 22, the minimum distance from the central axis 416 of the sliding shaft 413 to the plane 221 where the opening 22 is located is greater than or equal to the minimum distance from the center O of the reference circle 61 to the plane 221 where the opening 22 is located. The central axis 416 of the sliding shaft 413 and the third reference line 64 form an intersection point, the first reference line 62 and the reference circle 61 form an intersection point, and a connecting line between these two intersection points is perpendicular to the third reference line 64. That is, the connecting line between the starting point of the sliding shaft 413 and intersection point between the first reference line 62 and the reference circle 61 are perpendicular to the third reference line 64. In this way, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 423 extends along the direction close to the pivoting side 23 and the direction away from the box body 20. The sliding shaft 413 is located on the side of the first reference line 62 away from the target side 24. That is, the starting point of the sliding shaft 413 is located on the side of the first reference line 62 away from the target side 24, as illustrated in FIG. 3. In one embodiment, when the door body 30 blocks the opening 22, the sliding rail 423 extends along the direction close to the target side 24 and the direction away from the box body 20. The sliding shaft 413 is located on the side of the first reference line 62 facing the target side 24. That is, the sliding point of the sliding shaft 413 is located on the side of the first reference line 62 facing the target side 24. In this way, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, one of the sliding rail 422 and the sliding rail 423 extends along the direction close to the pivoting side 23 and the direction away from the box body 20, and the other of the sliding rail 422 and the sliding rail 423 extends along the direction close to the target side 24 and the direction away from the box body 20. That is, one of the sliding shaft 412 and the sliding shaft 413 is located on the side of the first reference line 62 away from the target side 24, and the other of the sliding shaft 412 and the sliding shaft 413 is located on the side of the first reference line 62 facing the target side 24, as illustrated in FIG. 6. In other words, the sliding rail 422 and the sliding rail 423 are respectively located on two sides of the sliding rail 421, which facilitates further ensure the stability of the movement of the door body 30.

In some embodiments of the present disclosure, when the door body 30 blocks the opening 22, the sliding shaft 412 and the sliding shaft 413 may also be located on the same side of the first reference line 62, which is not limited here.

Figure 7:
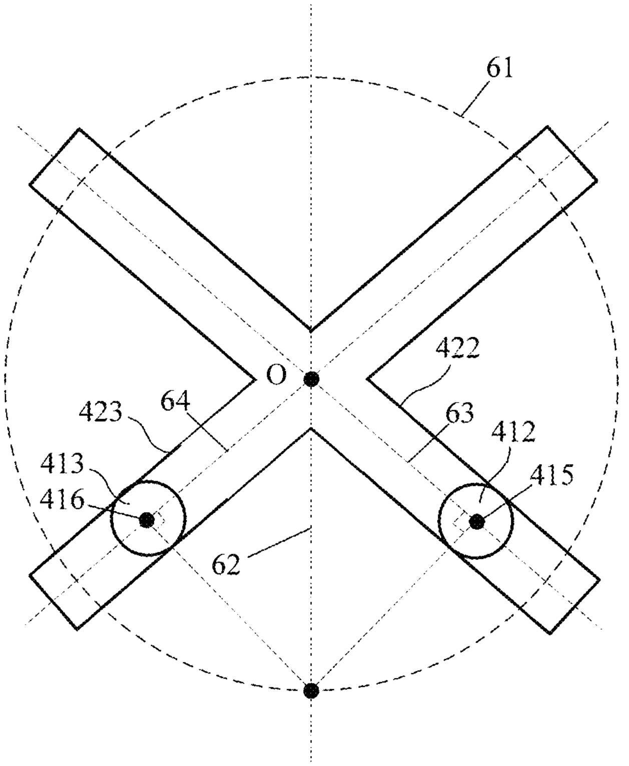
FIG. 7 is a structural schematic view illustrating the sliding shaft and the sliding rail in a third embodiment of the present disclosure.

As illustrated in FIG. 7, FIG. 7 is a structural schematic view illustrating the sliding shaft and the sliding rail in a third embodiment of the present disclosure.

In some embodiments, the hinge assembly 40 may only be provided with the sliding shaft 412, the sliding rail 422, the sliding shaft 413, and the sliding rail 423. Under the action of the hinge assembly 40, during the process from blocking the opening 22 by the door body 30 to opening the door body 30 relative to the box body 20, the sliding shaft 412 moves along the sliding rail 422, and the sliding shaft 413 moves along the sliding rail 423, which may guide the door body 30 to move according to the set trajectory.

Matching of Vertical Straight Sliding Rail and Elliptical Sliding Rail

Figure 8:
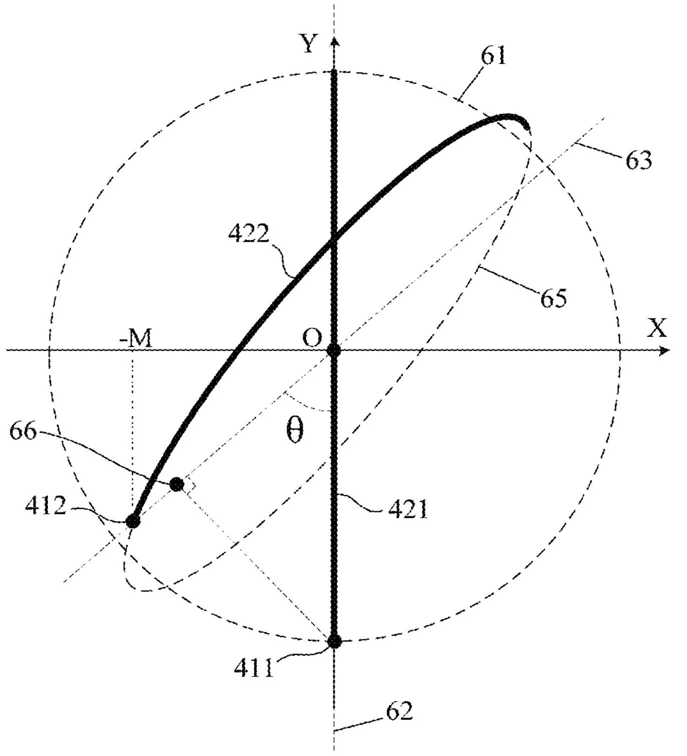
FIG. 8 is a structural schematic view illustrating the sliding shaft and the sliding rail in a fourth embodiment of the present disclosure.
Figure 9:
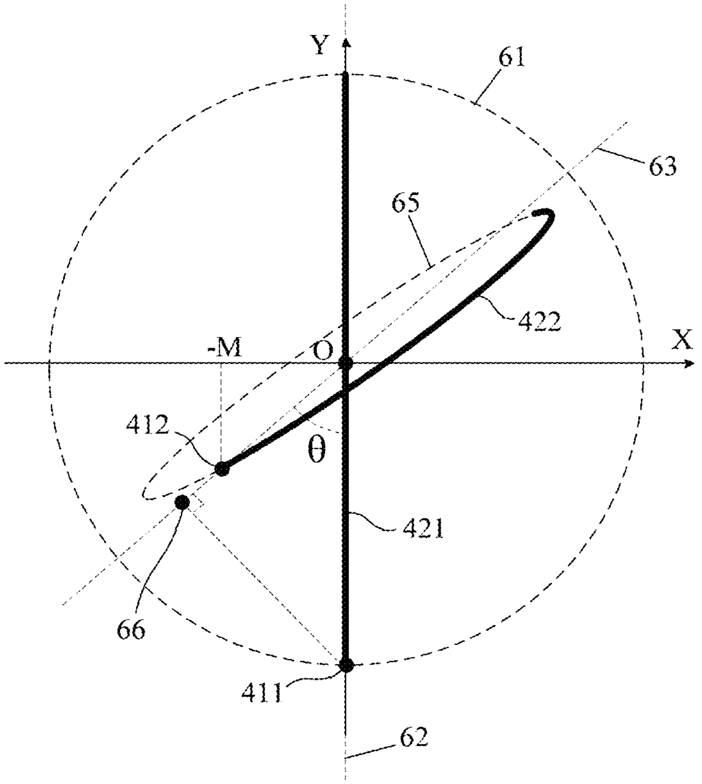
FIG. 9 is a structural schematic view illustrating the sliding shaft and the sliding rail in a fifth embodiment of the present disclosure.

As illustrated in FIG. 2, FIG. 8, and FIG. 9, FIG. 8 is a structural schematic view illustrating the sliding shaft and the sliding rail in a fourth embodiment of the present disclosure, and FIG. 9 is a structural schematic view illustrating the sliding shaft and the sliding rail in a fifth embodiment of the present disclosure. In some drawings of the present disclosure, the expression of widths of the sliding shaft and the sliding rail is omitted, and the central axis of the sliding shaft is configured to represent the sliding shaft and the center line of the sliding rail is configured to represent the sliding rail.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 linearly extends, and the sliding rail 422 extends along an ellipse. When the door body 30 blocks the opening 22, the sliding rail 421 is perpendicular to the plane 221 where the opening 22 is located, and a part of the sliding rail 422 away from the box body 20 is away from the pivoting side 23 relative to the sliding rail 421. Therefore, during the process from blocking the opening 22 by the door body 30 to opening the door body 30 relative to the box body 20, the door body 30 moves towards the target side 24 of the box body 20.

In some embodiments, the second connecting member 42 defines the reference circle 61, the first reference line 62, and a reference ellipse 65. The reference circle 61, the first reference line 62 and the reference ellipse 65 are coplanar. The center O of the reference circle 61 is located on the first reference line 62. The center O coincides with a center of the reference ellipse 65. When the door body 30 blocks the opening 22, the first reference line 62 is perpendicular to the plane 221 where the opening 22 is located. A part of the reference ellipse 65 away from the box body 20 is closer to the target side 24 relative to the first reference line 62.

The sliding rail 421 linearly extends along the first reference line 62, and the sliding rail 422 extends along the reference ellipse 65. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to the micro-slit or even seamless level, which facilitates the embedded installation of the box device.

The extension of the sliding rail along the reference ellipse means that the center line of the sliding rail coincides with the reference ellipse.

In some embodiments, the center of the ellipse is located on the sliding rail 421. When the door body 30 blocks the opening 22, the sliding shaft 411 and the sliding shaft 412 are away from the opening 22 relative to the center of the ellipse, and the sliding rail 422 extends along the direction close to the pivoting side 23 and the direction close to the box body 20.

In some embodiments, the second connecting member 42 further defines the second reference line 63, a first coordinate axis X, and a second coordinate axis Y. The second reference line 63 is coplanar with the first reference line 62 and also intersect with the first reference line 62 on the center O of the reference circle 61. An origin of a coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

An arbitrary point (x, y) of the reference ellipse 65 in the coordinate system satisfies the following relationship:

$$x = M/\sin(\theta) * \cos(90° - a - \theta) - R * \sin(a),$$

$$y = M/\sin(\theta) * \sin(90° - a - \theta),$$

X is a coordinate value of the arbitrary point on the first coordinate axis X, y is a coordinate value of the arbitrary point on the second coordinate axis Y, and M is a coordinate absolute value of the starting point of the sliding shaft 412 on the first coordinate axis X, a is the opening angle of the door body 30 relative to the box body 20, and 0 is an angle between the first reference line 62 and the second reference line 63.

When the door body 30 blocks the opening 22, the minimum distance from the central axis of the sliding shaft 411 to the plane 221 where the opening 22 is located and the minimum distance from the central axis of the sliding shaft 412 to the plane 221 where the opening 22 is located are greater than or equal to the minimum distance the from the center O of circle to the plane 221 where the opening 22 is located. The central axis of the sliding shaft 411 is located on the intersection point of the first reference line 62 and the reference circle 61. That is, the starting point of the sliding shaft 411 is located on the intersection point of the first reference line 62 and the reference circle 61. The central axis of the sliding shaft 412 is located on the intersection point of the reference ellipse 65 and the second reference line 63. That is, the starting point of the sliding shaft 412 is located on the intersection point of the reference ellipse 65 and the second reference line 63.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 422 bends along a direction close to the box body 20. In some embodiments, the second connecting member 42 further defines a reference point 66, and the reference point 66 is located on the second reference line 63. A connecting line between the reference point 66 and the intersection point of the first reference line 62 and the reference circle 61 is perpendicular to the second reference line 63. The starting point of the sliding shaft 412 is away from the center O of the reference circle 61 relative to the reference point 66. When the door body 30 blocks the opening 22, the sliding rail 422 is located on the side of the second reference line 63 facing the target side 24, as illustrated in FIG. 2 and FIG. 8.

In some embodiments, when the door body 30 blocks the opening 22, the sliding rail 422 bends along a direction away from the box body 20. In some embodiments, the starting point of the sliding shaft 412 is closer to the center O of the reference circle 61 relative to the reference point 66. When the door body 30 blocks the opening 22, the sliding rail 422 is located on the side of the second reference line 63 away from the target side 24, as illustrated in FIG. 2 and FIG. 9.

Figure 10:
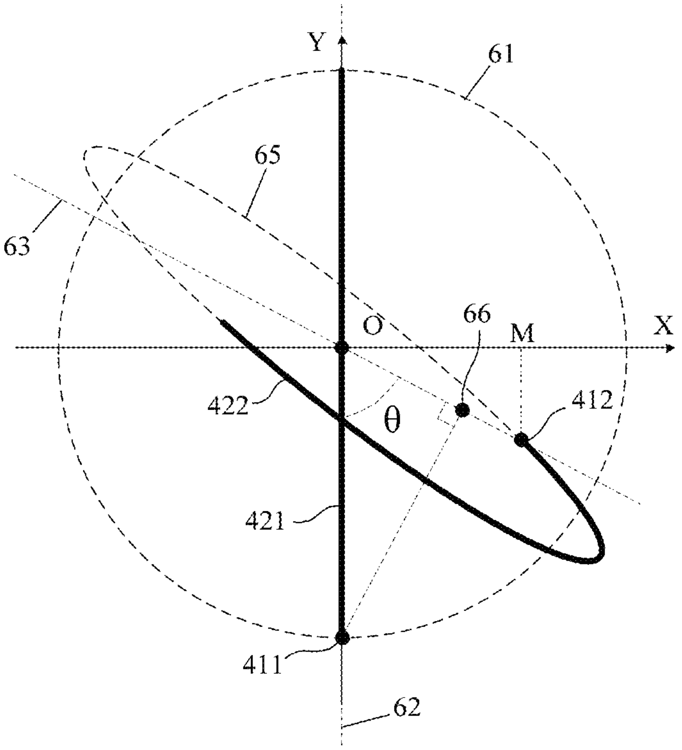
FIG. 10 is a structural schematic view illustrating the sliding shaft and the sliding rail in a sixth embodiment of the present disclosure.
Figure 11:
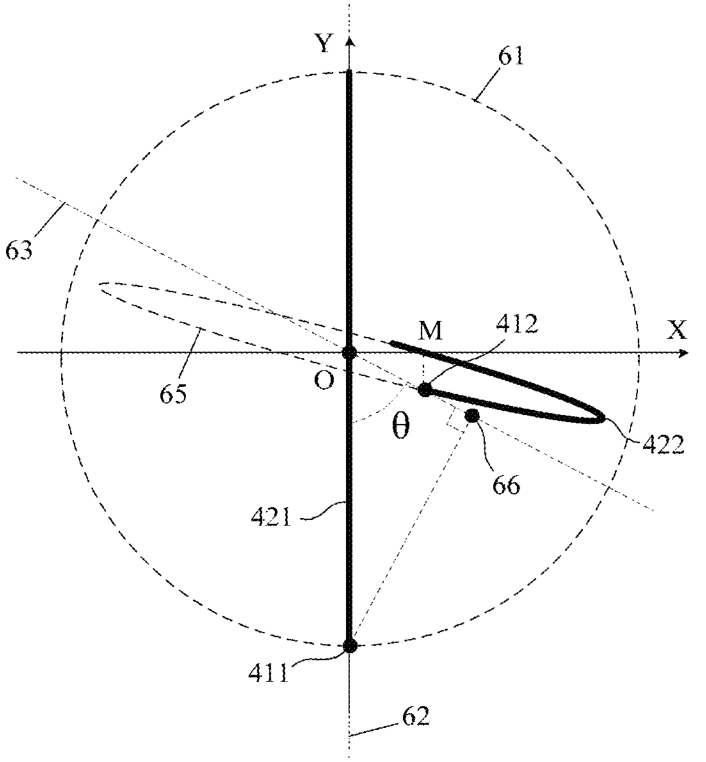
FIG. 11 is a structural schematic view illustrating the sliding shaft and the sliding rail in a seventh embodiment of the present disclosure.

As illustrated in FIG. 2, FIG. 10, and FIG. 11, FIG. 10 is a structural schematic view illustrating the sliding shaft and the sliding rail in a sixth embodiment of the present disclosure, and FIG. 11 is a structural schematic view illustrating the sliding shaft and the sliding rail in a seventh embodiment of the present disclosure.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 linearly extends, and the sliding rail 422 extends along an ellipse. When the door body 30 blocks the opening 22, the sliding rail 421 is perpendicular to the plane 221 where the opening 22 is located, and the part of the sliding rail 422 away from the box body 20 is close to the pivoting side 23 relative to the sliding rail 421. Therefore, during the process from blocking the opening 22 by the door body 30 to opening the door body 30 relative to the box body 20, the door body 30 moves towards the target side 24 of the box body 20.

In some embodiments, the second connecting member 42 defines the reference circle 61, the first reference line 62, and the reference ellipse 65. The reference circle 61, the first reference line 62 and the reference ellipse 65 are coplanar. The center O of the reference circle 61 is located on the first reference line 62. The center O coincides with the center of the reference ellipse 65. When the door body 30 blocks the opening 22, the first reference line 62 is perpendicular to the plane 221 where the opening 22 is located. The part of the reference ellipse 65 away from the box body 20 is away from the target side 24 relative to the first reference line 62.

The sliding rail 421 linearly extends along the first reference line 62, and the sliding rail 422 extends along the reference ellipse 65. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to the micro-slit or even seamless level, which facilitates the embedded installation of the box device.

In some embodiments, the center of the ellipse is located on the sliding rail 421. When the door body 30 blocks the opening 22, the sliding shaft 411 and the sliding shaft 412 are away from the opening 22 relative to the center of the ellipse. The sliding rail 422 bends along the direction close to the pivoting side 23 and the direction away from the box body 20.

In some embodiments, the second connecting member 42 further defines the second reference line 63, the first coordinate axis X, and the second coordinate axis Y. The second reference line 63 is coplanar with the first reference line 62 and also intersect with the first reference line 62 on the center O of the reference circle 61. The origin of the coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

The arbitrary point (x, y) of the reference ellipse 65 in the coordinate system satisfies the following relationship:

$$x = M/\sin(\theta)*\cos(90^\circ + a - \theta) + R*\sin(a),$$

$$y = -M/\sin(\theta)*\sin(90^\circ + a - \theta),$$

X is the coordinate value of the arbitrary point on the first coordinate axis X, y is the coordinate value of the arbitrary point on the second coordinate axis Y, and M is the coordinate absolute value of the starting point of the sliding shaft 412 on the first coordinate axis X, a is the opening angle of the door body 30 relative to the box body 20, and 0 is the angle between the first reference line 62 and the second reference line 63.

When the door body 30 blocks the opening 22, the minimum distance from the central axis of the sliding shaft 411 to the plane 221 where the opening 22 is located and the minimum distance from the central axis of the sliding shaft 412 to the plane 221 where the opening 22 is located are greater than or equal to the minimum distance from the center O of circle to the plane 221 where the opening 22 is located. The central axis of the sliding shaft 411 is located on the intersection point of the first reference line 62 and the reference circle 61. That is, the starting point of the sliding shaft 411 is located on the intersection point of the first reference line 62 and the reference circle 61. The central axis of the sliding shaft 412 is located on the intersection point of the reference ellipse 65 and the second reference line 63. That is, the starting point of the sliding shaft 412 is located on the intersection point of the reference ellipse 65 and the second reference line 63.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, a connecting line is formed between the sliding shaft 412 and the center of the ellipse, and the sliding rail 422 is located on a side of the connecting line away from the box body 20. In some embodiments, the second connecting member 42 further defines the reference point 66, and the reference point 66 is located on the second reference line 63. The connecting line between the reference point 66 and the intersection point of the first reference line 62 and the reference circle 61 is perpendicular to the second reference line 63. The starting point of the sliding shaft 412 is away from the center O of the reference circle 61 relative to the reference point 66. When the door body 30 blocks the opening 22, the sliding rail 422 is located on the side of the second reference line 63 facing the target side 24, as illustrated in FIG. 2 and FIG. 10.

In some embodiments, when the door body 30 blocks the opening 22, the connecting line is formed between the sliding shaft 412 and the center of the ellipse, and the sliding rail 422 is located on a side of the connecting line facing the box body 20. In some embodiments, the starting point of the sliding shaft 412 is closer to the center O of the reference circle 61 relative to the reference point 66. When the door body 30 blocks the opening 22, the sliding rail 422 is located on the side of the second reference line 63 away from the target side 24, as illustrated in FIG. 2 and FIG. 11.

Matching of Tilted Straight Sliding Rail and Elliptical Sliding Rail

Figure 12:
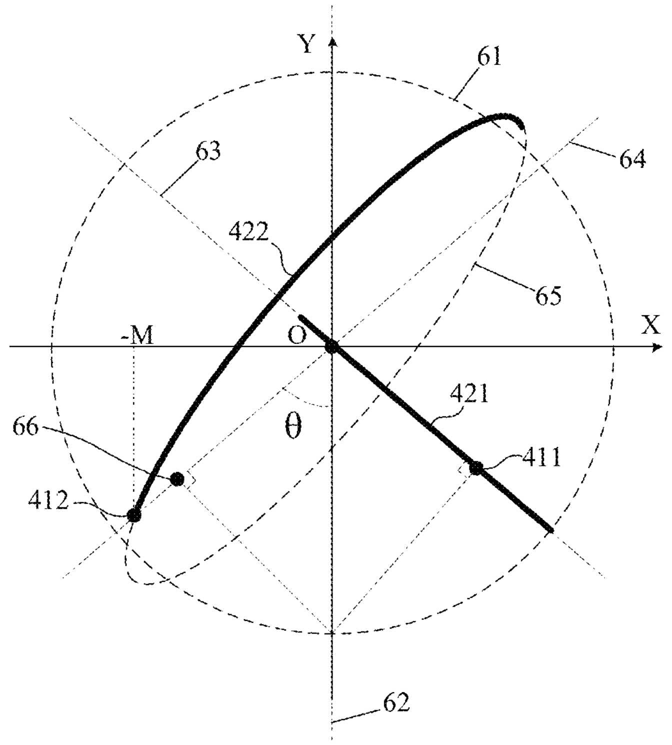
FIG. 12 is a structural schematic view illustrating the sliding shaft and the sliding rail in an eighth embodiment of the present disclosure.
Figure 13:
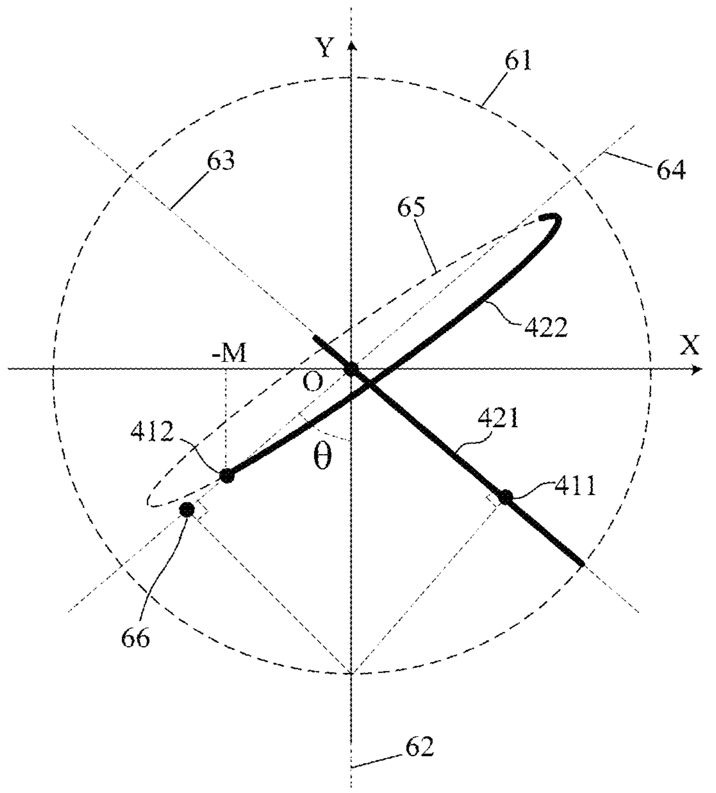
FIG. 13 is a structural schematic view illustrating the sliding shaft and the sliding rail in a ninth embodiment of the present disclosure.

As illustrated in FIG. 2, FIG. 12, and FIG. 13, FIG. 12 is a structural schematic view illustrating the sliding shaft and the sliding rail in an eighth embodiment of the present disclosure, and FIG. 13 is a structural schematic view illustrating the sliding shaft and the sliding rail in a ninth embodiment of the present disclosure.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 linearly extends, and the sliding rail 422 extends along the ellipse. When the door body 30 blocks the opening 22, the sliding rail 421 tilts relative to the plane 221 where the opening 22 is located, and the part of the sliding rail 422 away from the box body 20 is away from the pivoting side 23 relative to the sliding rail 421. Therefore, during the process from blocking the opening 22 by the door body 30 to opening the door body 30 relative to the box body 20, the door body 30 moves towards the target side 24 of the box body 20.

In some embodiments, the second connecting member 42 defines the reference circle 61, the first reference line 62, the second reference line 63, and the reference ellipse 65. The reference circle 61, the first reference line 62, the second reference line 63, and the reference ellipse 65 are coplanar. The first reference line 62 and the second reference line 63 intersect on the center O of the reference circle 61. The center O of the reference circle 61 coincides with the center of the reference ellipse 65. When the door body 30 blocks the opening 22, the first reference line 62 is perpendicular to the plane 221 where the opening 22 is located. The part of the reference ellipse 65 away from the box body 20 is closer to the target side 24 relative to the first reference line 62.

The sliding rail 421 linearly extends along the second reference line 63, and the sliding rail 422 extends along the reference ellipse 65. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to the micro-slit or even seamless level, which facilitates the embedded installation of the box device.

In some embodiments, the center of the ellipse is located on the sliding rail 421. When the door body 30 blocks the opening 22, the sliding shaft 411 and the sliding shaft 412 are away from the opening 22 relative to the center of the ellipse, and the sliding rail 422 extends along the direction close to the pivoting side 23 and the direction close to the box body 20.

In some embodiments, the second connecting member 42 further defines a third reference line 64, the first coordinate axis X, and the second coordinate axis Y. The third reference line 64 is coplanar with the first reference line 62 and also intersect with the first reference line 62 on the center O of the reference circle 61. The origin of the coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

The arbitrary point (x, y) of the reference ellipse 65 in the coordinate system satisfies the following relationship:

$$x = M/\sin(\theta) * \cos(90° - a - \theta) - R * \sin(a),$$

$$y = M/\sin(\theta) * \sin(90° - a - \theta),$$

X is the coordinate value of the arbitrary point on the first coordinate axis X, y is the coordinate value of the arbitrary point on the second coordinate axis Y, and M is the coordinate absolute value of the starting point of the sliding shaft 412 on the first coordinate axis X, a is the opening angle of the door body 30 relative to the box body 20, and 0 is an angle between the first reference line 62 and the third reference line 64.

When the door body 30 blocks the opening 22, the minimum distance from the central axis of the sliding shaft 411 to the plane 221 where the opening 22 is located and the minimum distance from the central axis of the sliding shaft 412 to the plane 221 where the opening 22 is located are greater than or equal to the minimum distance the from the center O of circle to the plane 221 where the opening 22 is located. The central axis of the sliding shaft 411 and the second reference line 63 forms the intersection point, the first reference line 62 and the reference circle 61 forms the intersection point, and the connecting line between these two intersection points is perpendicular to the second reference line 63. That is, the connecting line between the starting point of the sliding shaft 411 and the intersection point of the first reference line 62 and the reference circle 61 is perpendicular to the second reference line 63. The central axis of the sliding shaft 412 is located on the intersection point of the reference ellipse 65 and the third reference line 64. That is, the starting point of the sliding shaft 412 is located on the intersection point of the reference ellipse 65 and the third reference line 64.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 422 bends along the direction close to the box body 20. In some embodiments, the second connecting member 42 further defines the reference point 66, and the reference point 66 is located on the second reference line 63. The connecting line between the reference point 66 and the intersection point of the first reference line 62 and the reference circle 61 is perpendicular to the third reference line 64. The starting point of the sliding shaft 412 is away from the center O of the reference circle 61 relative to the reference point 66. When the door body 30 blocks the opening 22, the sliding rail 422 is located on a side of the third reference line 64 facing the target side 24, as illustrated in FIG. 2 and FIG. 12.

In some embodiments, when the door body 30 blocks the opening 22, the sliding rail 422 bends along the direction away from the box body 20. In some embodiments, the starting point of the sliding shaft 412 is closer to the center O of the reference circle 61 relative to the reference point 66. When the door body 30 blocks the opening 22, the sliding rail 422 is located on the side of the third reference line 64 away from the target side 24, as illustrated in FIG. 2 and FIG. 13.

In some embodiments, when the door body 30 blocks the opening 22, the sliding rail 421 extends along the direction close to the pivoting side 23 and the direction away from the box body 20. The sliding shaft 411 is located on the side of the first reference line 62 away from the target side 24. That is, the starting point of the sliding shaft 411 is located on the side of the first reference line 62 away from the target side 24, as illustrated in FIGS. 12 and 13. In one embodiment, when the door body 30 blocks the opening 22, the sliding rail 421 extends along the direction close to the target side 24 and the direction away from the box body 20. The sliding shaft 411 is located on the side of the first reference line 62 facing the target side 24. That is, the starting point of the sliding shaft 411 is located on the side of the first reference line 62 facing the target side 24. In this way, under the action of the hinge assembly 40, during the process from blocking the opening 22 by the door body 30 to opening the door body 30 relative to the box body 20, the door body 30 may move according to the set trajectory.

Figure 14:
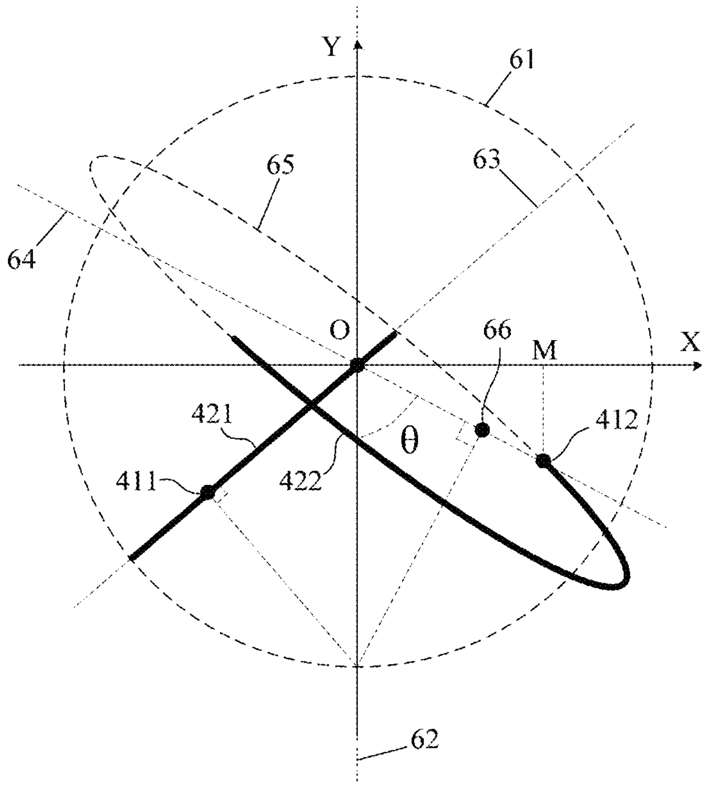
FIG. 14 is a structural schematic view illustrating the sliding shaft and the sliding rail in a tenth embodiment of the present disclosure.
Figure 15:
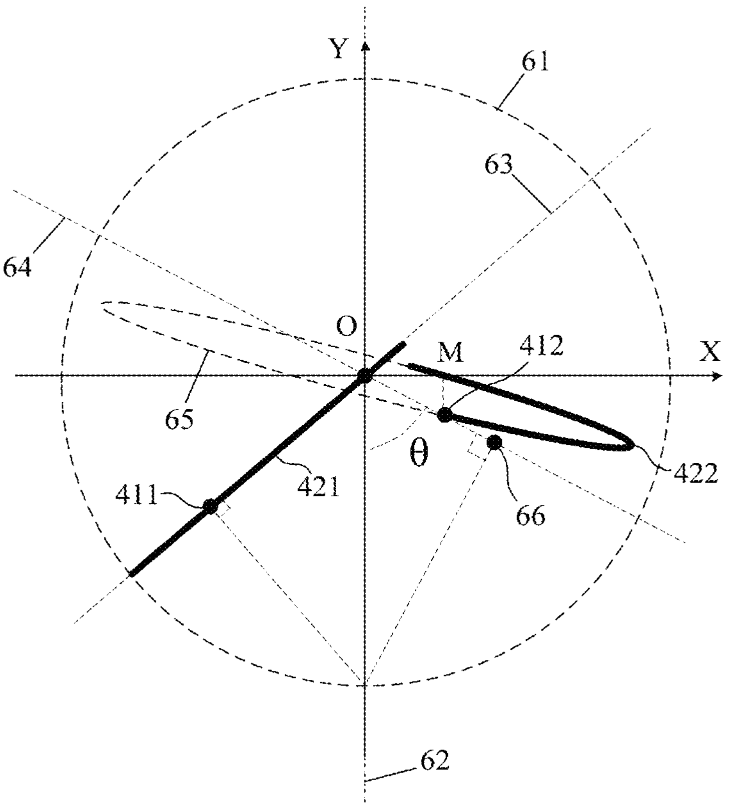
FIG. 15 is a structural schematic view illustrating the sliding shaft and the sliding rail in an eleventh embodiment of the present disclosure.

As illustrated in FIG. 2, FIG. 14, and FIG. 15, FIG. 14 is a structural schematic view illustrating the sliding shaft and the sliding rail in a tenth embodiment of the present disclosure, and FIG. 15 is a structural schematic view illustrating the sliding shaft and the sliding rail in an eleventh embodiment of the present disclosure.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 linearly extends, and the sliding rail 422 extends along the ellipse. When the door body 30 blocks the opening 22, the sliding rail 421 tilts relative to the plane 221 where the opening 22 is located, and the part of the sliding rail 422 away from the box body 20 is close to the pivoting side 23 relative to the sliding rail 421. Therefore, during the process from blocking the opening 22 by the door body 30 to opening the door body 30 relative to the box body 20, the door body 30 moves towards the target side 24 of the box body 20.

In some embodiments, the second connecting member 42 defines the reference circle 61, the first reference line 62, the second reference line 63, and the reference ellipse 65. The reference circle 61, the first reference line 62, the second reference line 63, and the reference ellipse 65 are coplanar. The first reference line 62 and the second reference line 63 intersect on the center O of the reference circle 61. The center O of the reference circle 61 coincides with the center of the reference ellipse 65. When the door body 30 blocks the opening 22, the first reference line 62 is perpendicular to the plane 221 where the opening 22 is located. The part of the reference ellipse 65 away from the box body 20 is away from the target side 24 relative to the first reference line 62.

The sliding rail 421 linearly extends along the second reference line 63, and the sliding rail 422 extends along the reference ellipse 65. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to the micro-slit or even seamless level, which facilitates the embedded installation of the box device.

In some embodiments, the center of the ellipse is located on the sliding rail 421. When the door body 30 blocks the opening 22, the sliding shaft 411 and the sliding shaft 412 are away from the opening 22 relative to the center of the ellipse, and the sliding rail 422 bends along the direction close to the pivoting side 23 and the direction away from the box body 20.

In some embodiments, the second connecting member 42 further defines a third reference line 64, the first coordinate axis X, and the second coordinate axis Y. The third reference line 64 is coplanar with the first reference line 62 and also intersect with the first reference line 62 on the center O of the reference circle 61. The origin of the coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

The arbitrary point (x, y) of the reference ellipse 65 in the coordinate system satisfies the following relationship:

$$x = M/\sin(\theta) * \cos(90° + a - \theta) + R * \sin(a),$$

$$y = -M/\sin(\theta) * \sin(90° + a - \theta),$$

X is the coordinate value of the arbitrary point on the first coordinate axis X, y is the coordinate value of the arbitrary point on the second coordinate axis Y, and M is the coordinate absolute value of the starting point of the sliding shaft 412 on the first coordinate axis X, a is the opening angle of the door body 30 relative to the box body 20, and 0 is an angle between the first reference line 62 and the third reference line 64.

When the door body 30 blocks the opening 22, the minimum distance from the central axis of the sliding shaft 411 to the plane 221 where the opening 22 is located and the minimum distance from the central axis of the sliding shaft 412 to the plane 221 where the opening 22 is located are greater than or equal to the minimum distance the from the center O of circle to the plane 221 where the opening 22 is located. The central axis of the sliding shaft 411 and the second reference line 63 forms the intersection point, the first reference line 62 and the reference circle 61 forms the intersection point, and the connecting line between these two intersection points is perpendicular to the second reference line 63. That is, the connecting line between the starting point of the sliding shaft 411 and the intersection point of the first reference line 62 and the reference circle 61 is perpendicular to the second reference line 63. The central axis of the sliding shaft 412 is located on the intersection point of the reference ellipse 65 and the third reference line 64. That is, the starting point of the sliding shaft 412 is located on the intersection point of the reference ellipse 65 and the third reference line 64.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 422 is located on the side of the connecting line between the sliding shaft 412 and the center of the ellipse away from the box body 20. In some embodiments, the second connecting member 42 further defines the reference point 66, and the reference point 66 is located on the second reference line 63. The connecting line between the reference point 66 and the intersection point of the first reference line 62 and the reference circle 61 is perpendicular to the third reference line 64. The starting point of the sliding shaft 412 is away from the center O of the reference circle 61 relative to the reference point 66. When the door body 30 blocks the opening 22, the sliding rail 422 is located on a side of the third reference line 64 facing the target side 24, as illustrated in FIG. 2 and FIG. 14.

In some embodiments, when the door body 30 blocks the opening 22, the sliding rail 422 is located on the side of the connecting line between the sliding shaft 412 and the center of the ellipse close to the box body 20. In some embodiments, the starting point of the sliding shaft 412 is closer to the center O of the reference circle 61 relative to the reference point 66. When the door body 30 blocks the opening 22, the sliding rail 422 is located on the side of the third reference line 64 away from the target side 24, as illustrated in FIG. 2 and FIG. 15.

In some embodiments, when the door body 30 blocks the opening 22, the sliding rail 421 extends along the direction close to the target side 24 and the direction away from the box body 20. The sliding shaft 411 is located on the side of the first reference line 62 facing the target side 24. That is, the starting point of the sliding shaft 411 is located on the side of the first reference line 62 close to the target side 24. In this way, a larger included angle between the sliding rail 421 and the sliding rail 422 may be ensured, which facilitate the stability of the movement of the sliding shaft 411 and the sliding shaft 412. That is, it ensures the stable movement of the door body 30.

Matching of Elliptical Sliding Rails

Figure 16:
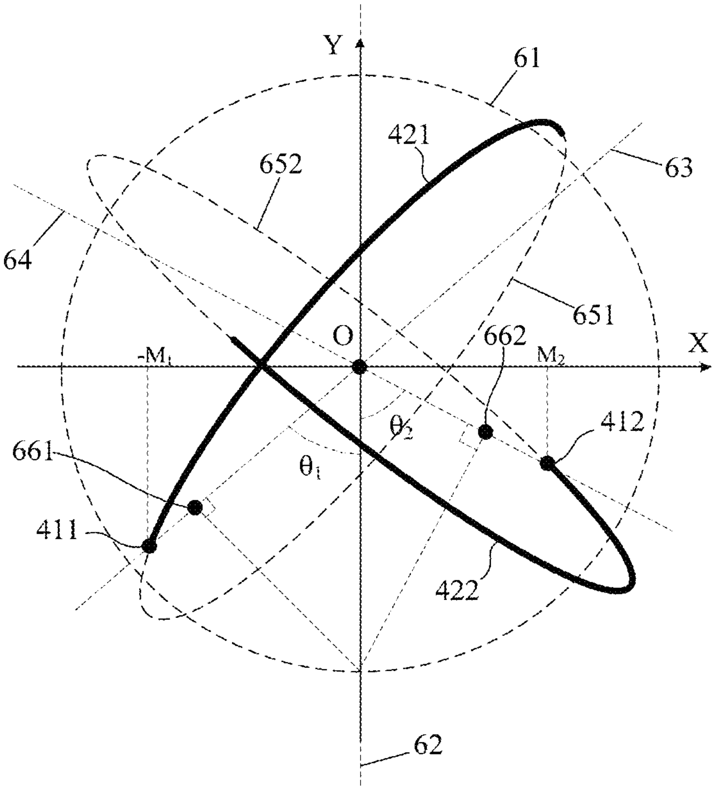
FIG. 16 is a structural schematic view illustrating the sliding shaft and the sliding rail in a twelfth embodiment of the present disclosure.
Figure 17:
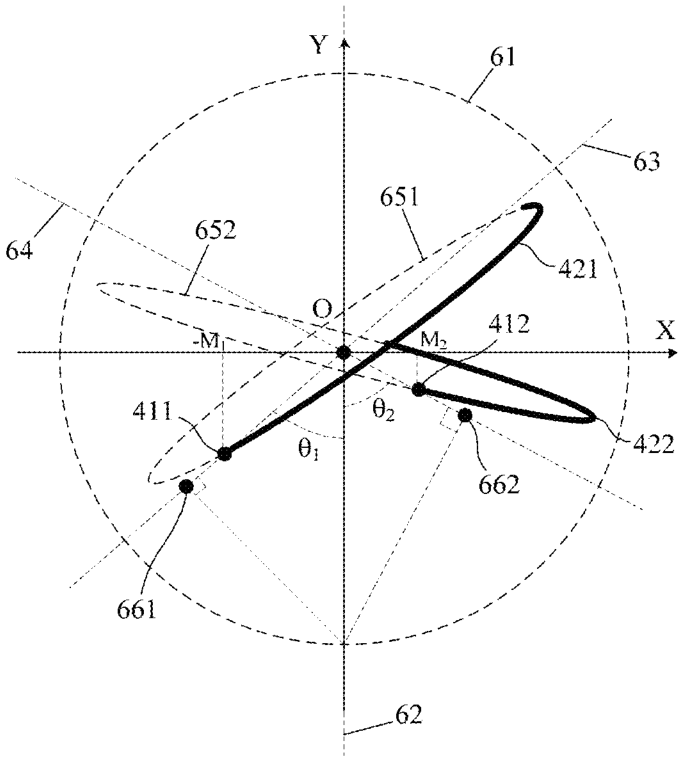
FIG. 17 is a structural schematic view illustrating the sliding shaft and the sliding rail in a thirteenth embodiment of the present disclosure.

As illustrated in FIG. 2, FIG. 16, and FIG. 17, FIG. 16 is a structural schematic view illustrating the sliding shaft and the sliding rail in a twelfth embodiment of the present disclosure, and FIG. 17 is a structural schematic view illustrating the sliding shaft and the sliding rail in a thirteenth embodiment of the present disclosure.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 extends along a first reference ellipse 651, the sliding rail 422 extends along a second reference ellipse 652. When the door body 30 blocks the opening 22, the part of the sliding rail 421 away from the box body 20 is away from the pivoting side 23, and the part of the sliding rail 422 away from the box body 20 is close to the pivoting side 23. Therefore, during the process from blocking the opening 22 by the door body 30 to opening the door body 30 relative to the box body 20, the door body 30 moves towards the target side 24 of the box body 20.

The part of the sliding rail away from the box body 20 being away from the pivoting side 23 means that the part of the sliding rail away from the box body 20 is farther away from the pivoting side 23 than the part of the sliding rail close to the box body 20. The part of the sliding rail away from the box body 20 being close to the pivoting side 23 means that the part of the sliding rail away from the box body 20 is closer to the pivoting side 23 than the part of the sliding rail close to the box body 20.

In some embodiments, the second connecting member 42 defines the reference circle 61, the first reference line 62, the first reference ellipse 651, and the second reference ellipse 652. The reference circle 61, the first reference line 62, the first reference ellipse 651, and the second reference ellipse 652 are coplanar. The center O of the reference circle 61 is located on the first reference line 62. The center of the first reference ellipse 651 and the center of the second reference ellipse 652 all coincide with the center O of the circle. When the door body 30 blocks the opening 22, the first reference line 62 is perpendicular to the plane 221 where the opening 22 is located, and the part of the first reference ellipse 651 away from the box body 20 is close to the target side 24 relative to the first reference line 62, and the part of the second reference ellipse 652 away from the box body 20 is away from the target side 24 relative to the first reference line 62.

The sliding rail 421 extends along the first reference ellipse 651, and the sliding rail 422 extends along the second reference ellipse 652. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to a micro-slit or even seamless level, which facilitates the embedded installation of the box device.

In some embodiments, when the door body 30 blocks the opening 22, the sliding shaft 411 is away from the opening 22 relative to the center of the first reference ellipse 651, and the sliding rail 421 extends along the direction close to the pivoting side 23 and the direction close to the box body 20.

In some embodiments, the second connecting member 42 further defines the second reference line 63, the first coordinate axis X, and the second coordinate axis Y. The second reference line 63 is coplanar with the first reference line 62 and also intersect with the first reference line 62 on the center O of the reference circle 61. The origin of the coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

An arbitrary point (x, y) of the first reference ellipse 651 in the coordinate system satisfies the following relationship:

$$x = M_1/\sin(\theta_1) * \cos(90° - a - \theta_1) - R * \sin(a),$$

$$y = M_1/\sin(\theta_1) * \sin(90° - a - \theta_1),$$

X is the coordinate value of the arbitrary point on the first coordinate axis X, y is the coordinate value of the arbitrary point on the second coordinate axis Y, and $M_1$ is the coordinate absolute value of the starting point of the sliding shaft 411 on the first coordinate axis X, a is the opening angle of the door body 30 relative to the box body 20, and 01 is the angle between the first reference line 62 and the second reference line 63.

When the door body 30 blocks the opening 22, the minimum distance from the central axis of the sliding shaft 411 to the plane 221 where the opening 22 is located is greater than or equal to the minimum distance from the center O of the reference circle 61 to the plane 221 where the opening 22 is located. The central axis of the sliding shaft 411 is located on an intersection point of the first reference ellipse 651 and the second reference line 63. That is, the starting point of the sliding shaft 411 is located on the intersection point of the first reference ellipse 651 and the second reference line 63.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 421 bends along the direction close to the box body 20. In some embodiments, the second connecting member 42 further defines a first reference point 661, and the first reference point 661 is located on the second reference line 63. A connecting line between the first reference point 661 and the intersection point of the first reference line 62 and the reference circle 61 is perpendicular to the second reference line 63. The starting point of the sliding shaft 411 is away from the center O of the reference circle 61 relative to the first reference point 661. When the door body 30 blocks the opening 22, the sliding rail 421 is located on the side of the second reference line 63 facing the target side 24, as illustrated in the FIG. 2 and FIG. 16.

In some embodiments, when the door body 30 blocks the opening 22, the sliding rail 421 bends along the direction away from the box body 20. In some embodiments, the starting point of the sliding shaft 411 is closer to the center O of the reference circle 61 relative to the first reference point 661. When the door body 30 blocks the opening 22, the sliding rail 421 is located on the side of the second reference line 63 away from the target side 24, as shown in FIG. 2 and FIG. 17.

In some embodiments, when the door body 30 blocks the opening 22, the sliding shaft 412 is away from the opening 22 relative to the center of the second reference ellipse 652, and the sliding rail 422 bends along the direction close to the pivoting side 23 and the direction away from the box body 20.

In some embodiments, the second connecting member 42 further defines a third reference line 64. The third reference line 64 is coplanar with the first reference line 62 and intersects with the first reference line 62 on the center O of the reference circle 61.

An arbitrary point (x, y) of the second reference ellipse 652 in the coordinate system satisfies the following relationship:

$$x = M_2/\sin(\theta_2) * \cos(90° + a - \theta_2) + R * \sin(a),$$

$$y = -M_2/\sin(\theta_2) * \sin(90° + a - \theta_2),$$

X is the coordinate value of the arbitrary point on the first coordinate axis X, y is the coordinate value of the arbitrary point on the second coordinate axis Y, and $M_2$ is the coordinate absolute value of the starting point of the sliding shaft 412 on the first coordinate axis X, a is the opening angle of the door body 30 relative to the box body 20, and 02 is an angle between the first reference line 62 and the third reference line 64.

When the door body 30 blocks the opening 22, the minimum distance from the central axis of the sliding shaft 412 to the plane 221 where the opening 22 is located is greater than or equal to the minimum distance from the center O of the reference circle 61 to the plane 221 where the opening 22 is located. The central axis of the sliding shaft 412 is located on an intersection point of the second reference ellipse 652 and the third reference line 64. That is, the starting point of the sliding shaft 412 is located on the intersection point of the second reference ellipse 652 and the third reference line 64.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 422 is located on a side of a connecting line between the sliding shaft 412 and the center of the second reference ellipse 652 away from the box body 20. In some embodiments, the second connecting member 42 further defines a second reference point 662, and the second reference point 662 is located on the third reference line 64. The connecting line between the second reference point 662 and the intersection point of the first reference line 62 and the reference circle 61 is perpendicular to the third reference line 64. The starting point of the sliding shaft 412 is away from the center O of the reference circle 61 relative to the second reference point 662. When the door body 30 blocks the opening 22, the sliding rail 422 is located on the side of the third reference line 64 facing the target side 24, as illustrated in the FIG. 2 and FIG. 16.

In some embodiments, when the door body 30 blocks the opening 22, the sliding rail 422 is located on a side of the connecting line between the sliding shaft 412 and the center of the second reference ellipse 652 facing the box body 20. In some embodiments, the starting point of the sliding shaft 412 is close to the center O of the reference circle 61 relative to the second reference point 662. When the door body 30 blocks the opening 22, the sliding rail 422 is located on the side of the third reference line 64 away from the target side 24, as illustrated in FIG. 2 and FIG. 17.

Figure 18:
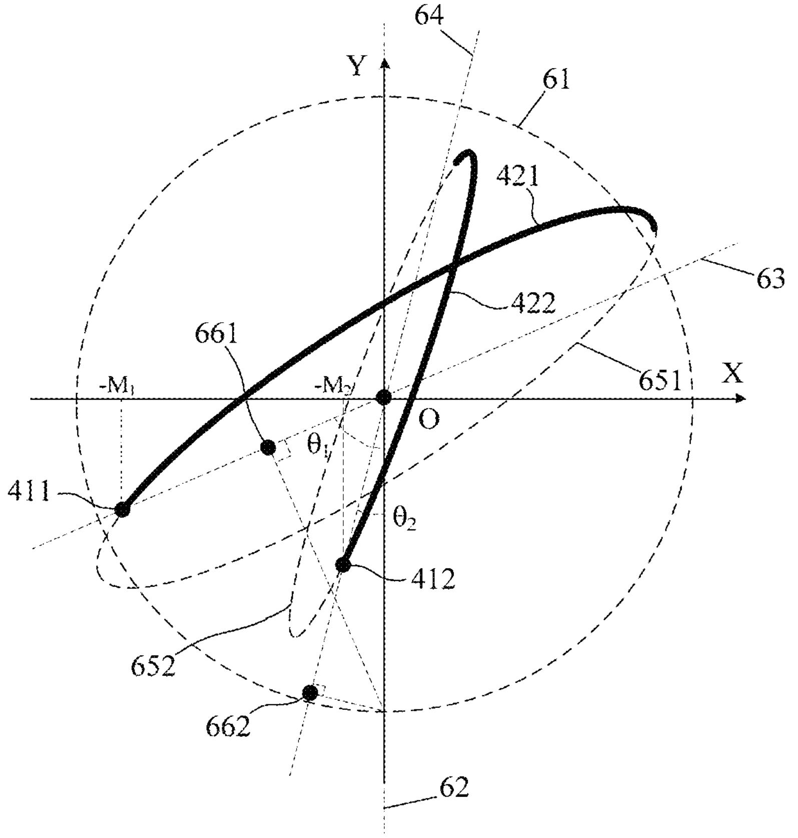
FIG. 18 is a structural schematic view illustrating the sliding shaft and the sliding rail in a fourteenth embodiment of the present disclosure.
Figure 19:
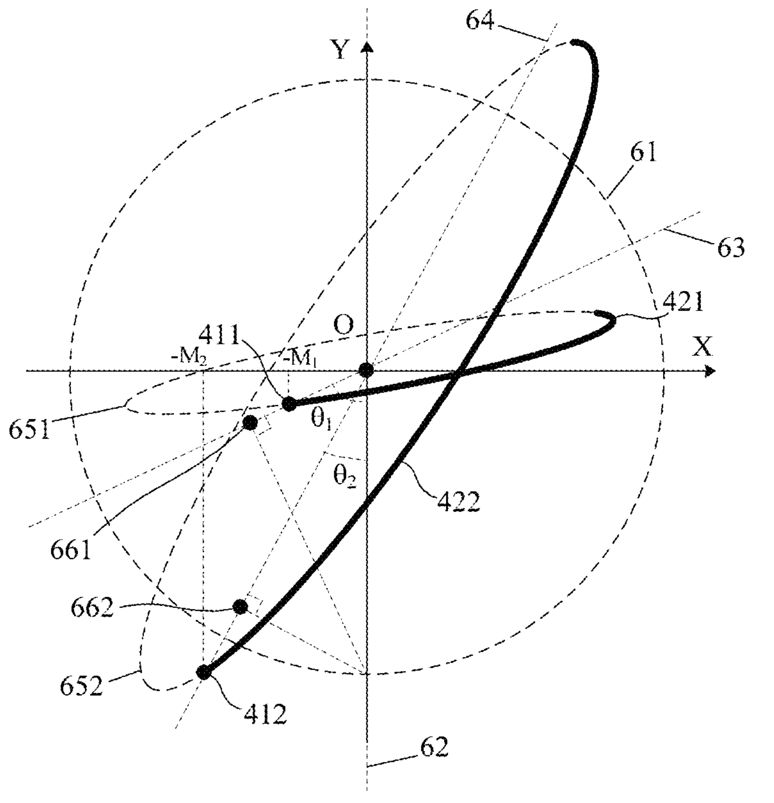
FIG. 19 is a structural schematic view illustrating the sliding shaft and the sliding rail in a fifteenth embodiment of the present disclosure.

As illustrated in FIG. 2, FIG. 18, and FIG. 19, FIG. 18 is a structural schematic view illustrating the sliding shaft and the sliding rail in a fourteenth embodiment of the present disclosure, and FIG. 19 is a structural schematic view illustrating the sliding shaft and the sliding rail in a fifteenth embodiment of the present disclosure.

In some embodiments, the first connecting member 41 is provided with at least the sliding shaft 411 and the sliding shaft 412, and the second connecting member 42 is provided with at least the sliding rail 421 and the sliding rail 422. The sliding shaft 411 is connected to the sliding rail 421 and may move along the sliding rail 421, and the sliding shaft 412 is connected to the sliding rail 422 and may move along the sliding rail 422.

The sliding rail 421 extends along the first reference ellipse 651, the sliding rail 422 extends along the second reference ellipse 652. When the door body 30 blocks the opening 22, the part of the sliding rail 421 away from the box body 20 and the part of the sliding rail 422 away from the box body 20 are away from the pivoting side 23. Therefore, during the process from blocking the opening 22 by the door body 30 to opening the door body 30 relative to the box body 20, the door body 30 moves towards the target side 24 of the box body 20.

In some embodiments, the second connecting member 42 defines the reference circle 61, the first reference line 62, the first reference ellipse 651, and the second reference ellipse 652. The reference circle 61, the first reference line 62, the first reference ellipse 651, and the second reference ellipse 652 are coplanar. The center O of the reference circle 61 is located on the first reference line 62. The center of the first reference ellipse 651 and the center of the second reference ellipse 652 all coincide with the center O of the circle. When the door body 30 blocks the opening 22, the first reference line 62 is perpendicular to the plane 221 where the opening 22 is located, and the part of the first reference ellipse 651 away from the box body 20 and the part of the second reference ellipse 652 away from the box body 20 are close to the target side 24 relative to the first reference line 62.

The sliding rail 421 extends along the first reference ellipse 651, and the sliding rail 422 extends along the second reference ellipse 652. During the process from blocking the opening 22 by the door body 30 to opening the door body 30 relative to the box body 20, the sliding shaft 411 moves along the sliding rail 421, and the sliding shaft 412 moves along the sliding rail 422, and the door body 30 moves towards the target side 24 of the box body 20.

By the above modes, under the action of the hinge assembly 40, during the process from blocking the opening 22 by the door body 30 to opening the door body 30 relative to the box body 20, the door body 30 moves towards the target side 24 of the box body 20. Therefore, the extent to which the door body 30 exceeds the outer sidewall 25 of the box body 20 reduces, which may reduce the risk of the door body 30 interfering with and colliding with the external structure during rotating the door body 30. In other words, the present embodiment reduces the gap between the box device and the external structure located next to the box device to the micro-slit or even seamless level, which facilitates the embedded installation of the box device.

The first reference ellipse 651 is different from the second reference ellipse 652. That is, the degree to which the part of the first reference ellipse 651 away from the box 20 is close to the target side 24 is different from the degree to which the part of the second reference ellipse 652 away from the box 20 is close to the target side 24.

In some embodiments, when the door body 30 blocks the opening 22, the sliding shaft 411 is away from the opening 22 relative to the center of the first reference ellipse 651, and the sliding rail 421 extends along the direction close to the pivoting side 23 and the direction close to the box body 20.

In some embodiments, the second connecting member 42 further defines the second reference line 63, the first coordinate axis X, and the second coordinate axis Y. The second reference line 63 is coplanar with the first reference line 62 and also intersect with the first reference line 62 on the center O of the reference circle 61. The origin of the coordinate system defined by the first coordinate axis X and the second coordinate axis Y is the center O of the reference circle 61. When the door body 30 blocks the opening 22, the first coordinate axis X is parallel to the plane 221 where the opening 22 is located, and the second coordinate axis Y is perpendicular to the plane 221 where the opening 22 is located.

The arbitrary point (x, y) of the first reference ellipse 651 in the coordinate system satisfies the following relationship:

$$x = M_1/\sin(\theta_1) * \cos(90° - a - \theta_1) - R * \sin(a),$$

$$y = M_1/\sin(\theta_1) * \sin(90° - a - \theta_1),$$

X is the coordinate value of the arbitrary point on the first coordinate axis X, y is the coordinate value of the arbitrary point on the second coordinate axis Y, and $M_1$ is the coordinate absolute value of the starting point of the sliding shaft 411 on the first coordinate axis X, a is the opening angle of the door body 30 relative to the box body 20, and 01 is the angle between the first reference line 62 and the second reference line 63.

When the door body 30 blocks the opening 22, the minimum distance from the central axis of the sliding shaft 411 to the plane 221 where the opening 22 is located is greater than or equal to the minimum distance from the center O of the reference circle 61 to the plane 221 where the opening 22 is located. The central axis of the sliding shaft 411 is located on an intersection point of the first reference ellipse 651 and the second reference line 63. That is, the starting point of the sliding shaft 411 is located on the intersection point of the first reference ellipse 651 and the second reference line 63.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 421 bends along the direction close to the box body 20. In some embodiments, the second connecting member 42 further defines a first reference point 661, and the first reference point 661 is located on the second reference line 63. A connecting line between the first reference point 661 and the intersection point of the first reference line 62 and the reference circle 61 is perpendicular to the second reference line 63. The starting point of the sliding shaft 411 is away from the center O of the reference circle 61 relative to the first reference point 661. When the door body 30 blocks the opening 22, the sliding rail 421 is located on the side of the second reference line 63 facing the target side 24, as illustrated in the FIG. 2 and FIG. 18.

In some embodiments, when the door body 30 blocks the opening 22, the sliding rail 421 bends along the direction away from the box body 20. In some embodiments, the starting point of the sliding shaft 411 is closer to the center O of the reference circle 61 relative to the first reference point 661. When the door body 30 blocks the opening 22, the sliding rail 421 is located on the side of the second reference line 63 away from the target side 24, as shown in FIG. 2 and FIG. 19.

In some embodiments, when the door body 30 blocks the opening 22, the sliding shaft 412 is away from the opening 22 relative to the center of the second reference ellipse 652, and the sliding rail 422 extends along the direction close to the pivoting side 23 and the direction close to the box body 20.

In some embodiments, the second connecting member 42 further defines the third reference line 64. The third reference line 64 is coplanar with the first reference line 62 and intersects with the first reference line 62 on the center O of the reference circle 61.

The arbitrary point (x, y) of the second reference ellipse 652 in the coordinate system satisfies the following relationship:

$$x = M_2/\sin(\theta_2) * \cos(90° - a - \theta_2) - R * \sin(a),$$

$$y = M_2/\sin(\theta_2) * \sin(90° - a - \theta_2),$$

X is the coordinate value of the arbitrary point on the first coordinate axis X, y is the coordinate value of the arbitrary point on the second coordinate axis Y, and $M_2$ is the coordinate absolute value of the starting point of the sliding shaft 412 on the first coordinate axis X, a is the opening angle of the door body 30 relative to the box body 20, and 02 is an angle between the first reference line 62 and the third reference line 64.

When the door body 30 blocks the opening 22, the minimum distance from the central axis of the sliding shaft 412 to the plane 221 where the opening 22 is located is greater than or equal to the minimum distance from the center O of the reference circle 61 to the plane 221 where the opening 22 is located. The central axis of the sliding shaft 412 is located on an intersection point of the second reference ellipse 652 and the third reference line 64. That is, the starting point of the sliding shaft 412 is located on the intersection point of the second reference ellipse 652 and the third reference line 64.

Through the above modes, under the action of the hinge assembly 40, during the process from blocking the opening 22 by the door body 30 to opening the door body 30 relative to the box body 20, the door body 30 may move according to the set trajectory.

In some embodiments, when the door body 30 blocks the opening 22, the sliding rail 422 bends along the direction close to the box body 20. In some embodiments, the second connecting member 42 further defines the second reference point 662, the second reference point 662 is located on the third reference line 64. The connecting line between the second reference point 662 and the intersection point of the first reference line 62 and the reference circle 61 is perpendicular to the third reference line 64. The starting point of the sliding shaft 412 is away from the center O of the reference circle 61 relative to the second reference point 662. When the door body 30 blocks the opening 22, the sliding rail 422 is located on the side of the third reference line 64 facing the target side 24, as illustrated in the FIG. 2 and FIG. 18.

In some embodiments, when the door body 30 blocks the opening 22, the sliding rail 422 bends along the direction away from the box body 20. In some embodiments, the starting point of the sliding shaft 412 is close to the center O of the reference circle 61 relative to the second reference point 662. When the door body 30 blocks the opening 22, the sliding rail 422 is located on the side of the third reference line 64 away from the target side 24, as illustrated in FIG. 2 and FIG. 19.

In some embodiments, the starting point of the sliding shaft 411 is away from the center O of the reference circle 61 relative to the first reference point 661, and the starting point of the sliding shaft 412 is close to the center O of the reference circle 61 relative to the second reference point 662, as shown in FIG. 18. In one embodiment, the starting point of the sliding shaft 411 is close to the center O of the reference circle 61 relative to the first reference point 661, and the starting point of the sliding shaft 412 is away from the center O of the reference circle 61 relative to the second reference point 662, as shown in FIG. 19. In this way, there is a larger angle between the sliding rail 421 and the sliding rail 422, which facilitate the stability of the movement of the sliding shaft 411 and the sliding shaft 412. That is, it ensures the stable movement of the door body 30.

Inflection Point of Elliptical Sliding Rail

Figure 20:
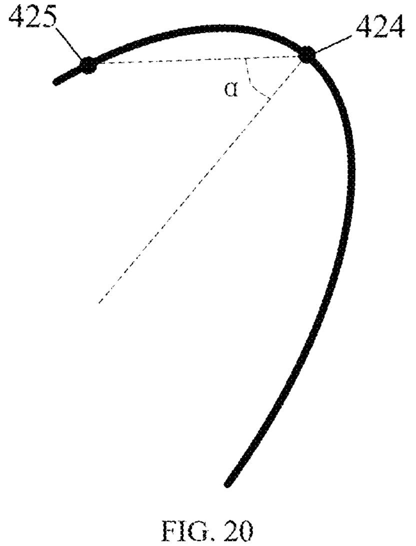
FIG. 20 is a structural schematic view illustrating the sliding rail extending along a reference ellipse in some embodiments of the present disclosure.

As illustrated in FIG. 20, FIG. 20 is a structural schematic view illustrating the sliding rail extending along a reference ellipse in some embodiments of the present disclosure.

In some embodiments, the sliding rail (including the reference ellipse of the above embodiments) extending along the ellipse intersects with the major axis of the ellipse at an inflection point 424. There is a target point 425 on the sliding rail, and the target point 425 is located on the side of the minor axis of the ellipse facing the inflection point 424. An included angle α between the major axis of the ellipse and a connecting line between any target point 425 and the inflection point 424 is greater than or equal to 10°.

Through the above modes, it may prevent the sliding rail from turning too large at the inflection point 424, and reduce the risk of jamming when the sliding shaft passes through the inflection point 424, which helps the smooth movement of the sliding shaft. That is, it ensures the smooth opening and closing of the door body. It reduces the overlapping degree of the rail sections on both sides of the sliding rail at the inflection point 424, which facilitates the stability of movement of the sliding shaft. That is, it ensures the stable movement of the door body, and it facilitates the design and manufacture of the sliding rail.

Angle Between Sliding Rails

Figure 21:
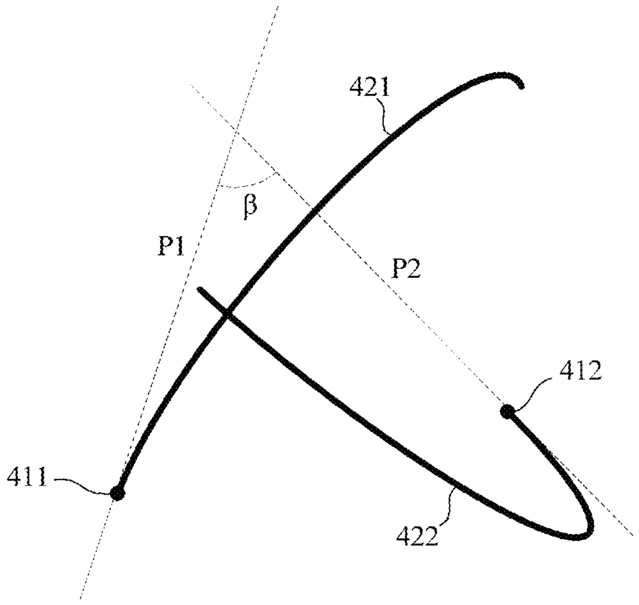
FIG. 21 is a structural schematic view illustrating the sliding shaft and the sliding rail in a sixteenth embodiment of the present disclosure.

As illustrated in FIG. 21, FIG. 21 is a structural schematic view illustrating the sliding shaft and the sliding rail in a sixteenth embodiment of the present disclosure.

In some embodiments, the sliding rail 421 where the sliding shaft 411 is located has a first tangent line P1, and the sliding rail 422 where the sliding shaft 412 is located has a second tangent line P2. An angle β between the first tangent line P1 and the second tangent line P2 is greater than or equal to 10°, which facilitates the stability of movement of the door body.

Setting Positions of Sliding Rails

Figure 22:
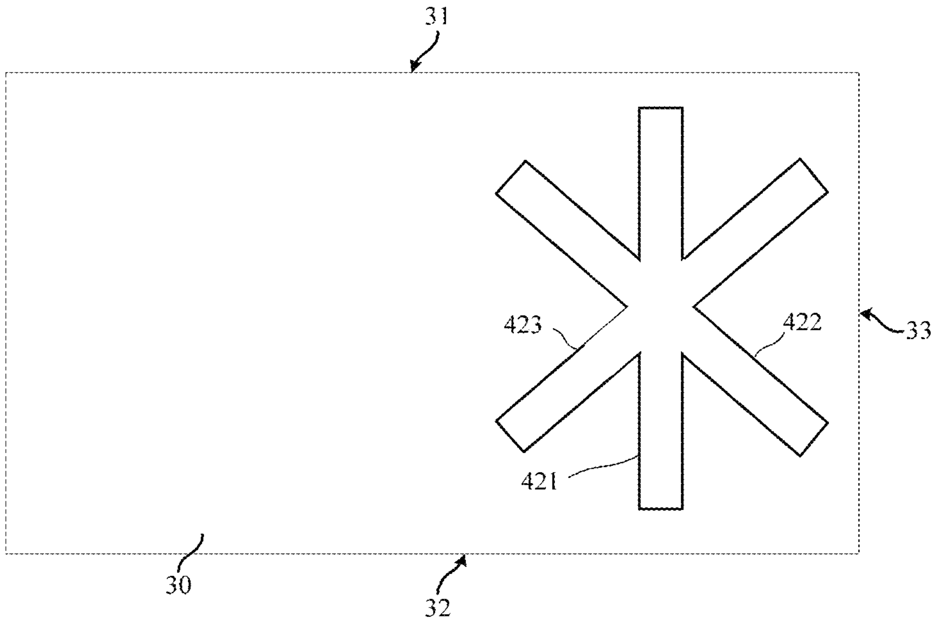
FIG. 22 is a structural schematic view of a part of the door body in the present disclosure.

As illustrated in FIG. 2 and FIG. 22, FIG. 22 is a structural schematic view of a part of the door body in the present disclosure.

The setting positions of the sliding rails may be described below based on the door body 30 being in the closed state.

In some embodiments, the minimum distances from the sliding rail to the inner edge 31, the outer edge 32, and the side edge 33 are all greater than or equal to 6 mm. In other words, the minimum distances from any one of the sliding rails including the sliding rail 421, the sliding rail 422, and the sliding rail 423 in the above embodiments to the inner edge 31, the outer edge 32, and the side edge 33 are all greater than or equal to 6 mm. In this way, enough space may be reserved for the design and manufacture of the sliding rail, which facilitates the engineering design and manufacture of the hinge assembly 40.

In some embodiments, different sliding rails may be spaced apart from each other, that is, there is no intersection between different sliding rails. In some embodiments, any two of the sliding rails including the sliding rail 421, the sliding rail 422, and the sliding rail 423 in the above embodiments are spaced apart from each other. In this way, it may ensure that at any time, different sliding shafts are in different sliding rails, which may avoid unstable movements of the sliding shafts caused by different sliding shafts being in the same sliding rail. Thus, it ensures the stability of movement of the door body.

The drawings corresponding to some embodiments of the present disclosure show a situation that there are intersections between different sliding rails. In this case, it is only necessary to have a large enough included angle between the tangent lines of the sliding rails where different sliding shafts are located in above embodiment, which may also ensure the stability of movement of the door body.

Size and Setting Position of Reference Circle

Figure 23:
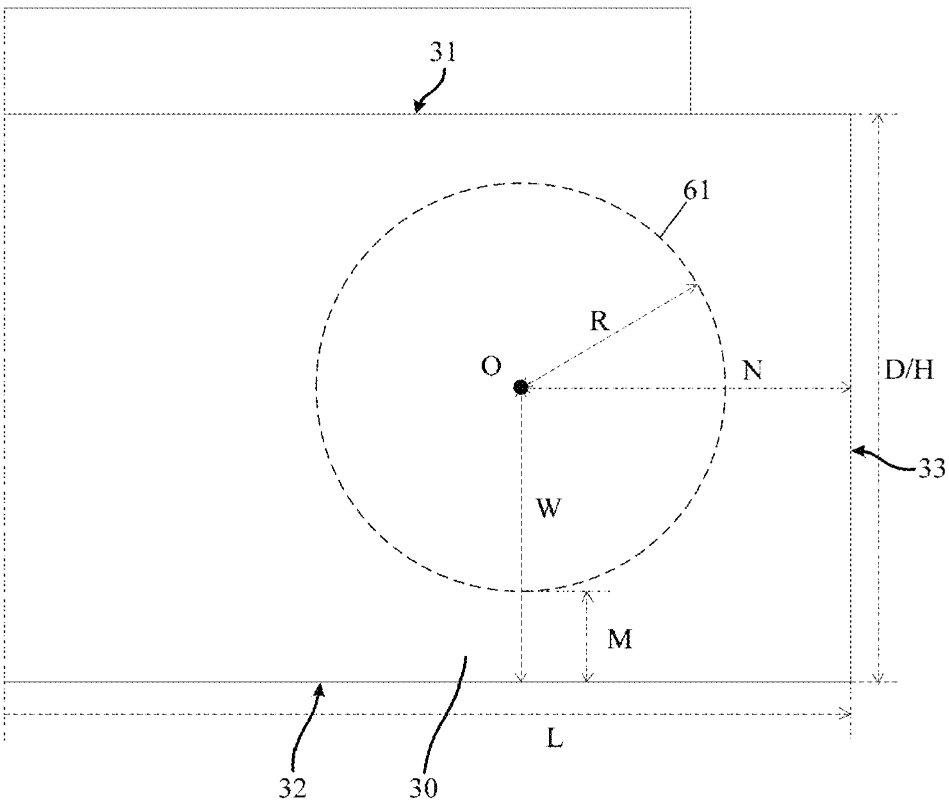
FIG. 23 is a structural schematic view of another part of the box device shown in FIG.

As illustrated in FIG. 2, FIG. 4, and FIG. 23, FIG. 23 is a structural schematic view of another part of the box device shown in FIG. 2.

The size and the setting position of the reference circle 61 may be described below based on the door body 30 being in the closed state.

In some embodiments, as the reference circle 61 moves from the side edge 33 to the target side 24 of the box body 20, the maximum distance that the outer side edge 35 of the door body 30 exceeds the outer sidewall 25 of the box body 20 gradually reduces. At the same time, considering that the reference circle 61 moving towards the target side 24 of the box body 20 may increase the amount of movement of the door body 30 towards the target side 24 during opening the door body 30.

In some embodiments, a radius of the reference circle 61 is defined as R, a distance from the center O of the reference circle 61 to the side edge 33 is defined as N, and R≤N≤100 mm. In this way, it may ensure that when the door body 30 is opened under the action of the hinge assembly 40, the maximum distance that the outer side edge 35 of the door body 30 exceeds the outer side-wall 25 of the box body 20 is controlled within 4 mm as required by the industry. The amount of movement of the door body 30 towards the target side 24 is controlled within a reasonable range, which reduces the risk of interference and collision between the second inner side edge 36 of the door body 30 and other structures, and reserves enough space for the user to open the door body 30. In some embodiments, the distance from the center O of the reference circle 61 to the side edge 33 is at least equal to the radius R of the reference circle 61, which facilitates the design and manufacture of the sliding shaft and the sliding rail of the hinge assembly 40.

In some embodiments, as the reference circle 61 moves from the outer edge 32 to the inner edge 31, the amount of movement of the outer side edge 35 of the door body 30 towards the box body 20 gradually increases during opening the door body 30, and the risk of interference and collision between the outer side edge 35 and box body 20 gradually increases. When the center O of the reference circle 61 is close to the opening 22 relative to the center of the side edge 33, the outer side edge 35 of the door body 30 may interfere with and collide with the box body 20 during opening the door body 30.

In some embodiments, a length of the side edge 33 of the door body 30 in the first direction Z1 is defined as D, a distance from the center O of the reference circle 61 to the outer edge 32 is defined as W, and R≤W≤(½) D. In this way, when the door body 30 is opened under the action of the hinge assembly 40, the risk of interference and collision between the outer side edge 35 of the door body 30 and the box body 20 may be reduced. In some embodiments, the distance from the center O of the reference circle 61 to the outer edge 32 is at least equal to the radius R of the reference circle 61, which facilitates the design and manufacture of the sliding shaft and the sliding rail of the hinge assembly 40.

In some embodiments, as the reference circle 61 moves from the side edge 33 to the target side 24 of the box body 20, the amount of movement of the first inner side edge 34 of the door body 30 towards the box body 20 gradually increases during opening the door body 30, and the risk of interference and collision between the first inner side edge 34 and the box body 20 gradually increases.

In some embodiments, the distance from the center O of the reference circle 61 to the side edge 33 is defined as N, and 15 mm≤N≤100 mm. In this way, when the door body 30 is opened under the action of the hinge assembly 40, the risk of interference and collision between the first inner side edge 34 of the door body 30 and the box body 20 may be reduced. In some embodiments, the distance from the center O of the reference circle 61 to the side edge 33 is at least 15 mm, which facilitates the design and manufacture of the sliding shaft and the sliding rail of the hinge assembly 40.

In some embodiments, as the reference circle 61 moves from the outer edge 32 to the inner edge 31, the amount of movement of the first inner side edge 34 of the door body 30 towards the box body 20 does not significantly change during opening the door body 30. In this case, the selection of the position of the reference circle 61 has less influence on the amount of interference between the first inner side edge 34 and the box body 20, and more consideration is given to the design and manufacture of the hinge assembly 40.

In some embodiments, the radius of the reference circle 61 is defined as R, the length of the side edge 33 in the first direction Z1 is defined as D, the distance from the center O of the reference circle 61 to the outer edge 32 is defined as W, and R≤W≤D. In this way, the selection of the position of the reference circle 61 is more flexible, and the sliding shaft and the sliding rail may be conveniently designed and manufactured. It may be adapted to the application scene where the maximum opening angle of the door body 30 reaches 150°.

In some embodiments, as the reference circle 61 moves from the side edge 33 to the target side 24 of the box body 20, the amount of movement of the third inner side edge 51 of the door seal 50 towards the box body 20 gradually increases during opening the door body 30, resulting in a gradual increase in the extrusion amount of the door seal 50. In order to ensure the reliability of the door seal 50, it is reasonable for the industry to require that the extrusion amount of the door seal 50 is controlled within 5 mm. That is, it is required that the maximum amount of movement of the third inner side edge 51 of the door seal 50 towards the box body 20 is less than or equal to 5 mm during opening the door body 30.

In some embodiments, the distance from the center O of the reference circle 61 to the side edge 33 is defined as N, and 15 mm≤N≤100 mm. In this way, it may ensure that the maximum amount of movement of the third inner side edge 51 of the door seal 50 towards the box body 20 is less than or equal to 5 mm during opening the door body 30, which facilitates improving the reliability and stability of the door seal 50. In some embodiments, the distance from the center O of the reference circle 61 to the side edge 33 is at least 15 mm, which facilitates the design and manufacture of the sliding shaft and the sliding rail of the hinge assembly 40.

In some embodiments, as the reference circle 61 moves from the outer edge 32 to the inner edge 31, the amount of movement of the third inner side edge 51 of the door seal 50 towards the box body 20 does not significantly change during opening the door body 30. In this case, the selection of the position of the reference circle 61 has less influence on the extrusion amount of the door seal 50, and more consideration is given to the design and manufacture of the hinge assembly 40.

In some embodiments, the radius of the reference circle 61 is defined as R, the length of the side edge 33 in the first direction Z1 is defined as D, the distance from the center O of the reference circle 61 to the outer edge 32 is defined as W, and R≤W≤D. In this way, the selection of the position of the reference circle 61 is more flexible, and the sliding shaft and the sliding rail may be conveniently designed and manufactured. It may be adapted to the application scene where the maximum opening angle of the door seal 50 reaches 150°.

In some embodiments, a length of the door body 30 in the first direction Z1 is defined as H, that is, a width of the door body 30 is defined as H, and 35 mm≤H≤100 mm. A length of the door body 30 in the second direction Z2 is defined as L, that is, a length of the door body 30 is defined as L, and 300 mm≤L≤700 mm. The radius of the reference circle 61 is defined as R, and R=(⅓) H. The minimum distance from the reference circle 61 to the outer edge 32 is defined as M, and 0 mm≤M≤15 mm.

Based on the requirements for the size and setting position of the reference circle 61 in the above-mentioned embodiments, the size and setting position of the reference circle 61 are reasonably selected, to reasonably determine the setting positions of the sliding shaft and the sliding rail. The sliding shaft and sliding rail designed and manufactured in this way may guide the door body 30 to move according to the trajectory set above. In some embodiments, the outer side edge 35 of the door body 30 moves according to the trajectory A1, and the maximum distance $g_{max}$ that the outer side edge 35 exceeds the outer sidewall 25 of the box body 20 may be controlled within 1 mm. The first inner side edge 34 of the door body 30 moves according to the trajectory A2, the amount of movement of the first inner side edge 34 towards the box body 20 is small, and the risk of interference between the first inner side edge 34 and the box body 20 is low. The second inner side edge 36 of the door body 30 moves according to the trajectory A3, and the maximum distance that the second inner side edge 36 exceeds the outer sidewall 25 of the box body 20 may be controlled within 3 mm. The third inner side edge 51 of the door seal 50 moves according to the trajectory A4, and the amount of movement of the third inner side edge 51 towards the box body 20 is small, that is, the extrusion amount of the door seal 50 is small.

In addition, in the present disclosure, unless otherwise expressly specified and limited, the terms "connection" and "stacking" and the like should be broadly understood. For example, it may be a fixed connection, a detachable connection, or an integrated connection; it may be a direct connection or an indirect connection through an intermediate medium; it may be the internal communication of two elements or the interaction relationship between two elements. The specific meanings of the above term may be understood according to specific circumstances.

Finally, it should be noted that the above embodiments are only used to illustrate the embodiments of the present disclosure, but not to limit the embodiments. Although the present disclosure has been described in detail with reference to the foregoing embodiments, the solutions described in the foregoing embodiments may still be modified, or some of the features or all of the features may be equivalently replaced. However, these modifications or replacements do not drive the essence of the corresponding solution to depart from the scope of the solution of each embodiment of the present disclosure.

What is claimed is:

1. A box device, comprising:

a box body, internally defining an accommodating space with an opening;

a door body, configured to block the opening; and a hinge assembly, disposed on a pivoting side of the box body and pivotally connecting the box body to the door body;

wherein the hinge assembly comprises a first connecting member and a second connecting member, the first connecting member is disposed on one of the box body and the door body, and the second connecting member is disposed on the other of the box body and the door body; the first connecting member is at least provided with a first sliding shaft and a second sliding shaft, and the second connecting member is at least provided with a first sliding rail and a second sliding rail; the first sliding shaft is connected to the first sliding rail and is able to move along the first sliding rail, and the second sliding shaft is connected to the second sliding rail and is able to move along the second sliding rail; and wherein the first sliding rail and the second sliding rail linearly extend; when the door body blocks the opening, the first sliding rail is perpendicular to a plane where the opening is located, the second sliding rail tilts relative to the plane where the opening is located, wherein the door body moves towards a target side of the box body during a process from blocking the opening by the door body to opening the door body relative to the box body; and the opening comprises two opposite sides, the pivoting side is disposed on one of the two opposite sides, and the target side is disposed on the other of the two opposite sides;

wherein the first connecting member is further provided with a third sliding shaft, and the second connecting member is further provided with a third sliding rail; the third sliding shaft is connected to the third sliding rail and is able to move along the third sliding rail, and the third sliding rail linearly extends; and the third sliding rail tilts relative to the plane where the opening is located and the second sliding rail when the door body blocks the opening;

wherein the first sliding rail intersects with the second sliding rail and the third sliding rail, to form an intersection point.

2. The box device according to claim 1, wherein the first sliding rail intersects with the second sliding rail to form an intersection point.

3. The box device according to claim 2, wherein the first sliding shaft and the second sliding shaft are away from the opening relative to the intersection point when the door body blocks the opening, and a connecting line between the first sliding shaft and the second sliding shaft is perpendicular to the second sliding rail.

4. The box device according to claim 1, wherein the second sliding rail extends along a direction close to the pivoting side and a direction away from the box body when the door body blocks the opening.

5. The box device according to claim 1, wherein the second sliding rail extends along a direction close to the target side and a direction away from the box body when the door body blocks the opening.

6. The box device according to claim 1, wherein the third sliding shaft is away from the opening relative to the intersection point when the door body blocks the opening, and a connecting line between the first sliding shaft and the third sliding shaft is perpendicular to the third sliding rail.

7. The box device according to claim 1, wherein the third sliding rail extends along a direction close to the pivoting side and a direction away from the box body when the door body blocks the opening.

8. The box device according to claim 1, wherein the third sliding rail extends along a direction close to the target side and a direction away from the box body when the door body blocks the opening.

9. The box device according to claim 1, wherein an end surface of the door body facing the hinge assembly has an inner edge, an outer edge, and a side edge; the inner edge and the outer edge are disposed at intervals along a first direction and extend along a second direction, the inner edge is connected to the outer edge by the side edge, the side edge extends along the first direction, and the first direction is perpendicular to the second direction; and the inner edge is close to the box body relative to the outer edge when the door body blocks the opening, and the first direction is perpendicular to the plane where the opening is located; and minimum distances from any one of the first sliding rail, the second sliding rail, and the third sliding rail to the inner edge, the outer edge, and the side edge are greater than or equal to 6 mm.

10. The box device according to claim 1, wherein the first sliding rail where the first sliding shaft is located has a first center line, the second sliding rail where the second sliding shaft is located has a second center line, and an included angle between the first center line and the second center line is greater than or equal to 10°.

11. The box device according to claim 1, wherein an end surface of the door body facing the hinge assembly has a side edge; when the door body blocks the opening, the side edge is perpendicular to the plane where the opening is located.

12. The box device according to claim 1, wherein an end surface of the door body facing the hinge assembly comprises an inner edge and an outer edge, the inner edge and the outer edge are disposed at intervals along a first direction and extend along a second direction, the first direction is perpendicular to the second direction, and the inner edge is close to the box body relative to the outer edge when the door body blocks the opening.

13. The box device according to claim 12, wherein the end surface of the door body facing the hinge assembly further comprises a side edge, the inner edge is connected to the outer edge by the side edge, and the side edge extends along the first direction.

14. The box device according to claim 12, wherein a length of the door body in the first direction is defined as H, and 35 mm≤H≤100 mm; a length of the door body in the second direction is defined as L, and 300 mm≤L≤700 mm.

* * * * *